US011928645B2

(12) United States Patent
Bakir et al.

(10) Patent No.: US 11,928,645 B2
(45) Date of Patent: Mar. 12, 2024

(54) SYSTEM, APPARATUS, AND METHOD FOR NETWORKED HAIR SALON PRODUCT PUMPS

(71) Applicant: BJDS, INC., Fairfax Station, VA (US)

(72) Inventors: Quis T Bakir, Fairfax Station, VA (US); Robinson B Nunez, Riverview, FL (US)

(73) Assignee: BJDS, INC., Fairfax Station, VA (US)

( * ) Notice: Subject to any disclaimer, the term of this patent is extended or adjusted under 35 U.S.C. 154(b) by 165 days.

(21) Appl. No.: 17/322,835

(22) Filed: May 17, 2021

(65) Prior Publication Data

US 2021/0272052 A1  Sep. 2, 2021

Related U.S. Application Data

(63) Continuation of application No. 15/601,726, filed on May 22, 2017, now Pat. No. 11,010,708.

(60) Provisional application No. 62/339,092, filed on May 20, 2016.

(51) Int. Cl.
*G06Q 10/08* (2023.01)
*G06Q 10/067* (2023.01)
*G06Q 10/087* (2023.01)
*G06Q 30/0601* (2023.01)

(52) U.S. Cl.
CPC ......... *G06Q 10/087* (2013.01); *G06Q 10/067* (2013.01); *G06Q 30/0635* (2013.01); *G06Q 30/0641* (2013.01)

(58) Field of Classification Search
CPC .... G06Q 10/087; G06Q 10/067; G06Q 10/06; G06Q 30/0635; G06Q 30/0641; G06Q 30/06
USPC .......................................................... 705/28
See application file for complete search history.

(56) References Cited

U.S. PATENT DOCUMENTS

| 8,109,875 | B2 * | 2/2012 | Gizewski | G16H 50/20 |
| | | | | 600/300 |
| 8,785,370 | B2 * | 7/2014 | Coppola | A61Q 5/00 |
| | | | | 530/357 |
| 9,177,339 | B2 * | 11/2015 | Saranow | G06Q 30/0621 |
| 11,010,708 | B2 * | 5/2021 | Bakir | G06Q 30/0641 |
| 2013/0123973 | A1 * | 5/2013 | Saranow | A45D 19/00 |
| | | | | 700/233 |
| 2014/0261518 | A1 * | 9/2014 | Savaides | A61K 8/46 |
| | | | | 424/70.2 |

* cited by examiner

*Primary Examiner* — Andrew Joseph Rudy
(74) *Attorney, Agent, or Firm* — Richard B. Almon

(57) ABSTRACT

A method, system and apparatus for coordinated distribution of hairstyling products using automatic pumps connected over a computer network is described, including, identifying a customer model of a customer, and receiving a product request for the customer. Based on the product request, a product and an amount of the product is determined to be distributed and a networked pump us selected, based on the product and the amount. For the selected pump, a request for distribution for the amount of the product is generated, and the selected pump automatically distributes the amount of the product based on the request for distribution. A confirmation of a distribution of the amount of the product is received from the selected pump, and the customer model is updated based on the amount of the product distributed.

9 Claims, 27 Drawing Sheets

This menu will be shown at the beginning, to select between lobby sign in and stylist desktop apps Stylist app to sign in, the stylist should select their user button The stylist will be asked to enter their password Stylists see their dashboard where they can manage their clients For Lobby customer sign in, this menu will be shown, the client needs to select having an appointment or walk in service if the client select have an appointment, he will be ask to enter the phone number or email, so the system can look them up, they will be prompted to confirm the appointment If the client select "I am a walk in", they will be asked to fill in a short contact form, select the services that they wish and a stylist list will be presented from the available stylists on shift to select from

SYSTEM, APPARATUS, AND METHOD FOR NETWORKED HAIR SALON PRODUCT PUMPS

CROSS-REFERENCE TO RELATED APPLICATION(S)

This application claims the benefit of U.S. Non-Provisional patent application Ser. No. 15/601,726, filed May 22, 2017, currently pending and entitled "SYSTEMS, APPARATUS, AND METHODS FOR NETWORKED HAIR SALON PRODUCT PUMPS," which claims priority to U.S. Provisional Patent App. No. 62/339,092, filed on May 20, 2016, the entire disclosure of these application being hereby incorporated herein by reference.

TECHNICAL FIELD

The present disclosure generally relates to hair salon management, and more specifically, a networked data system that enables the management of products, customers, and stylists.

BACKGROUND

Modern hair salons dispense a variety of different products for a variety of different services. Products may potentially cause health problems for a variety of reasons, for example, due to interactions with other products, due to the exposure of stylists and customers to harmful chemicals, and due to proper application techniques and protective wear not being used.

In addition to monitoring products, salons generally have many different disconnected ways of dispensing products. Keeping track of what products are available, and how to get them can be challenging.

In addition to tracking products, keeping track of customers and appointments can be challenging as well.

SUMMARY

Aspects of the present disclosure are to address at least the above-mentioned problems and/or disadvantages and to provide at least the advantages described below. Accordingly, an aspect of the present disclosure is to provide a method, system and apparatus for coordinated distribution of hairstyling products using automatic pumps connected over a computer network is described, including, identifying a customer model of a customer, and receiving a product request for the customer. Based on the product request, a product and an amount of the product is determined to be distributed and a networked pump us selected, based on the product and the amount. For the selected pump, a request for distribution for the amount of the product is generated, and the selected pump automatically distributes the amount of the product based on the request for distribution. A confirmation of a distribution of the amount of the product is received from the selected pump, and the customer model is updated based on the amount of the product distributed.

Other aspects, advantages, and salient features of the disclosure will become apparent to those skilled in the art from the following detailed description, which, taken in conjunction with the annexed drawings, discloses various embodiments of the present disclosure.

Figure 1B:
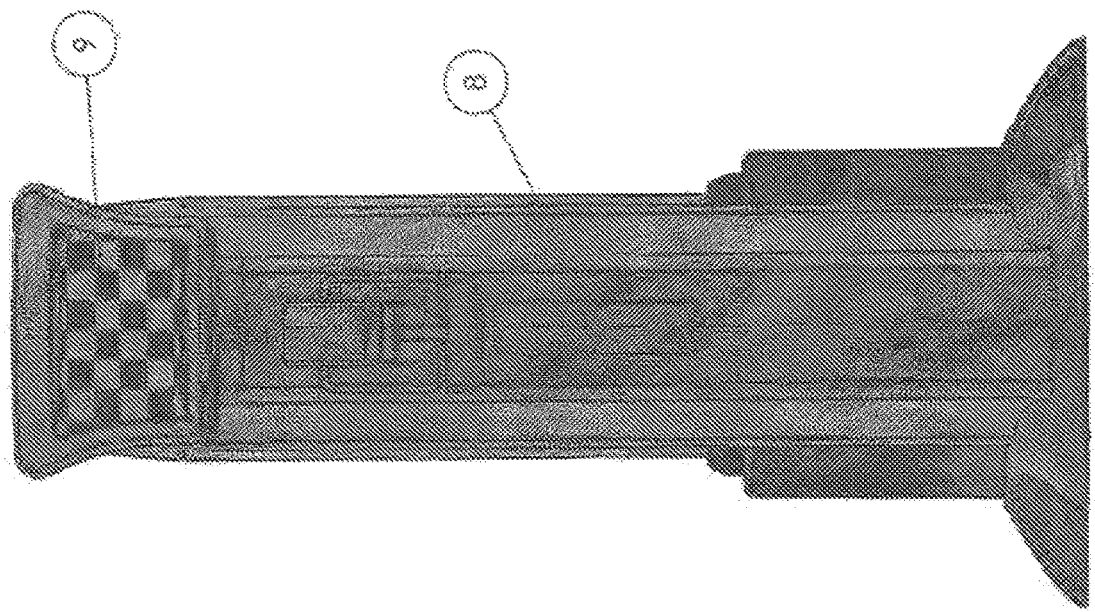
FIGS. 1A and 1B illustrate different views and components of a viscous liquid dispenser (VLD) system, according to some embodiments.
Figure 1A:
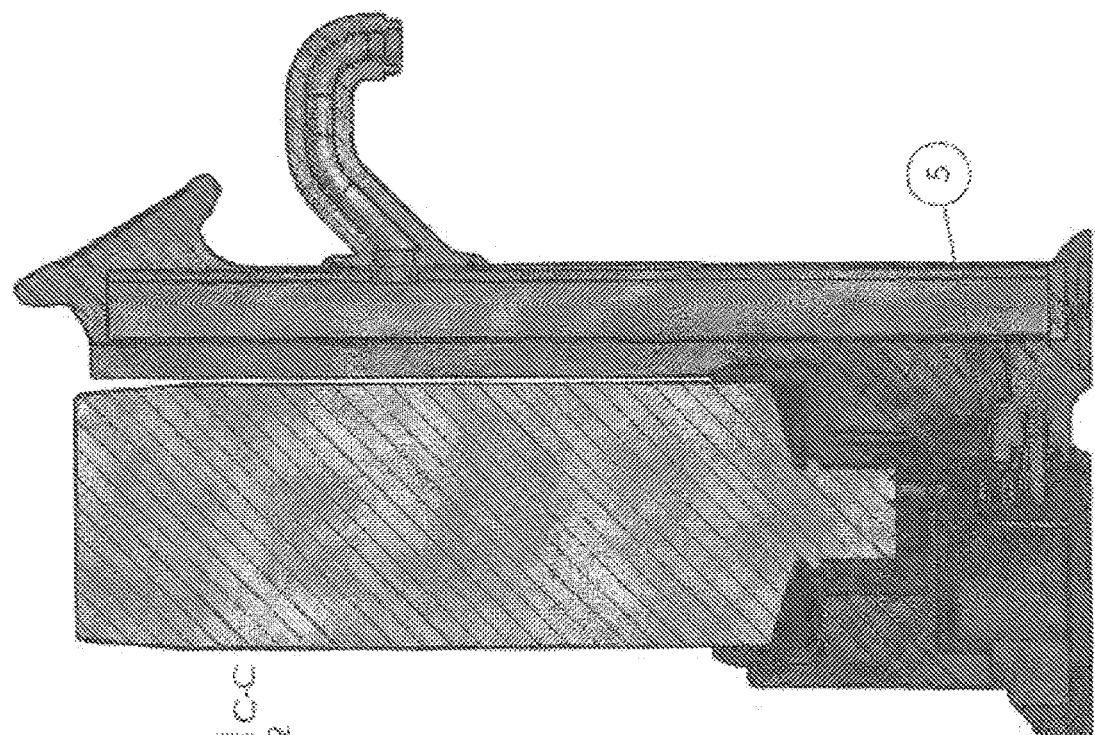
Figure 2:
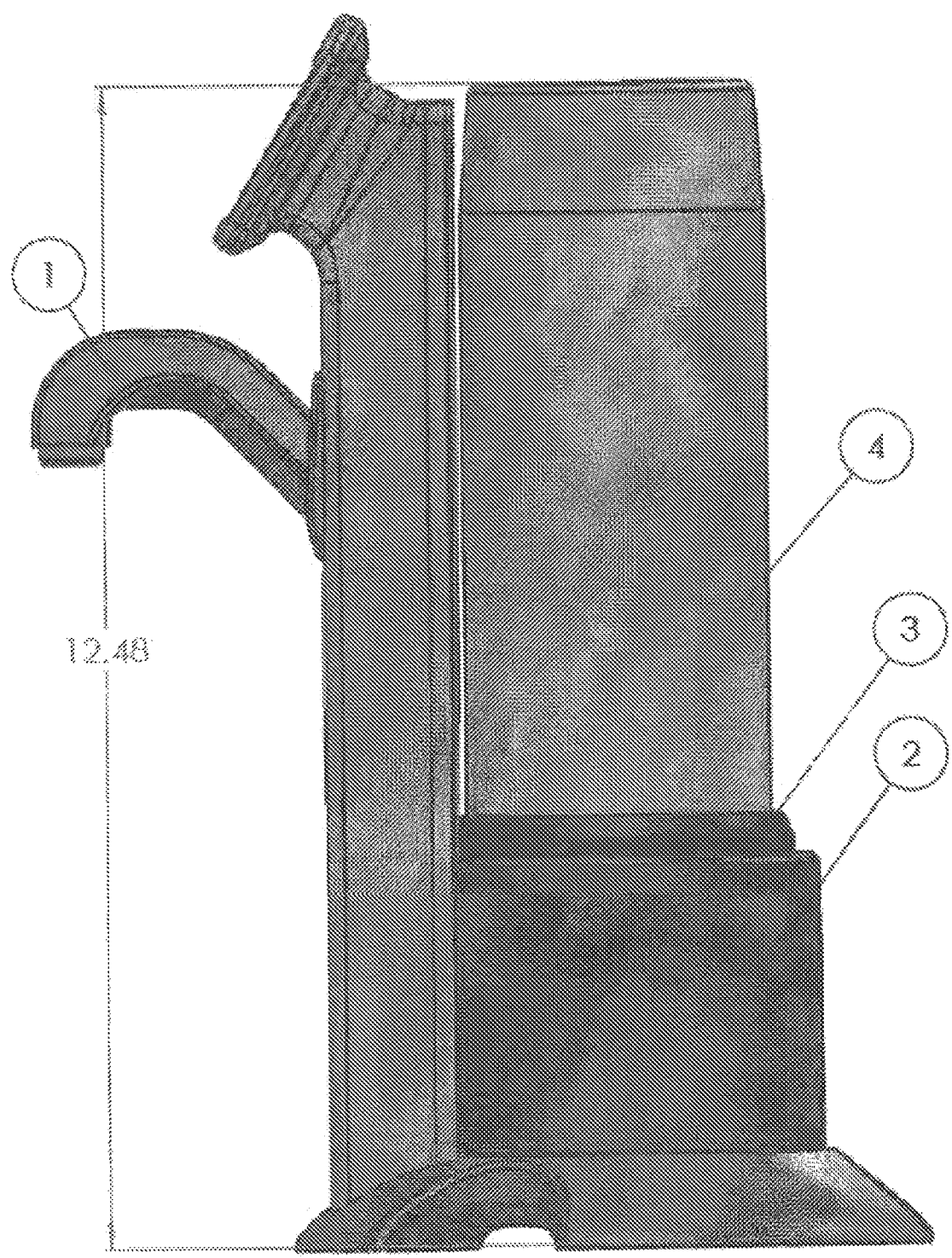
FIG. 2 illustrates different views and components of the VLD system, according to some embodiments.
Figure 3:
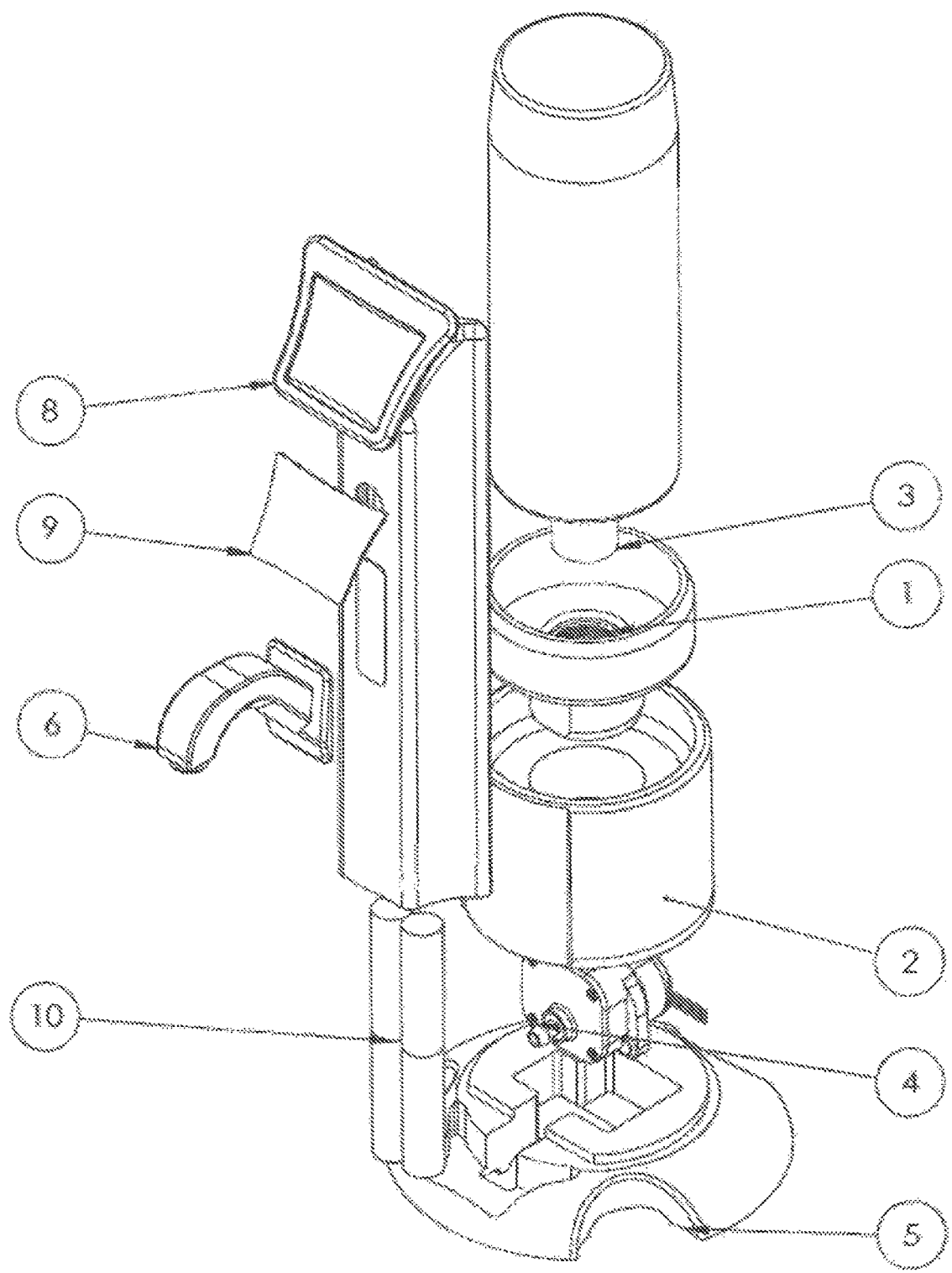
FIG. 3 illustrates different views and components of the VLD system, according to some embodiments.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label. Some elements in the figures may not have reference numbers, but one having skill in the relevant art(s), will understand the different elements shown.

DETAILED DESCRIPTION

In the following description, for the purposes of explanation, specific details are set forth in order to provide a thorough understanding of embodiments of the invention. However, it will be apparent that various embodiments may be practiced without these specific details. The figures and description are not intended to be restrictive.

Hair Salon Product Management System Overview

A comprehensive hair salon management and inventory system that includes various product dispensers that record usage data (of hair products, both powder bleach, and liquid) and relay said data to a software program, for the purpose of storing and tracking information about product usage. The plan is to then use that data to improve product usage, as explained below.

In addition to improving product management, the dispensers limit the exposure of toxic and high-carcinogen products that are used on a daily basis in the salons. Since the product is dispensed directly from the machine into the product/color bowl, the stylist will physically handle the product less, if at all, therefore they aren't as exposed the chemicals used to make hair products.

The data that is sent from the product dispenser is sent via an intranet to a server located on the salon premises. Tracking the data enables salon owners to track usage and reduce waste by keeping an inventory and identifying where and when products are overused or used unnecessarily.

The powder bleach dispenser is made of plastic material that doesn't react with the powder bleach or corrode. All dispenser components are removable for easy soap and water cleaning. There is a powder container which is removable and able to hold up to one pound of powder bleach.

The powder bleach dispenser has the capability to be charged wirelessly for safety and movability, in case there is water close by or if there isn't an electric outlet available. Each stylist in the salon has a user ID card that communicates with the product dispenser. The user card will have a Radio Frequency Identification (RFID) and when the stylist approaches the dispenser, it is able to read the card and "know" who is standing in from of the machine. The user enters the amount of product requested into a touch screen LCD (Liquid Crystal Display). The hair dresser/operator interacts with the LCD screen dispenser using GUI (graphical user interface). The operator is able to enter an exact amount manually or a preset amount by one touch button. GUI Touch Control Pad also has a "tap" feature button that dispenses a small amount or a "pinch" of the powder bleach to reach certain product consistency.

Networked Viscous Liquid Dispenser

FIGS. 1A, 1B, 2, 3 and 4 illustrate different views and components of a viscous liquid dispenser (VLD): The VLD is a countertop liquid measuring pumping system for tracking and/or dispensing liquids of varying viscosities. There are two different types of VLDs, one which dispenses shampoos and conditioners, and a second which dispenses hydrogen peroxide solutions (the hydrogen peroxide solution is what is mixed with the powder bleach used in the dispenser described above). The VLD that dispenses hydrogen peroxide (VLD1) functions exactly the same as the powder dispenser.

The VLD that dispenses shampoo and conditioner (VLD2) dispenses a pre-set amount each time it's used. The amount can be set manually by the owner/operator that sets up the machine. Onward, the amount dispensed each time is the same (this feature is significant in that it reduces waste/overuse of shampoo and conditioner by employees). The VLD2 manages and tracks the user and use of liquid products.

The VLD2 technology uses a microprocessor to manage the operation and human interface of the unit; the unit has on board removable storage for data logging, built-in wireless network communication to connect to a server for inventory management, battery operation, wireless charging, and RFID for user identification.

The VLD2 body is designed for serviceability and easy access of mechanical parts for maintenance. The VLD features a "quick fit" adapter that threads onto specific product bottles. This fitting allows easy swapping of product. The quick fit adapter is a quick disconnect and locking mechanism, which secure a fit into the VLD, with a proximity sensor/switch for touchless dispensing.

The VLD2 is powered by battery, providing the power to its microprocessor electronics, display, sensors and pump motor. It's wirelessly charging, eliminating the use of a power cord allowing versatility. It has a custom engineered industrial pump; the pump is driven by a microprocessor controlled motor that is with a smart algorithmic firmware that measures the volume amount dispensed.

The VLD2 is equipped with a color Liquid Crystal Display "LCD" and Touch Screen this LCD and its touch screen is used to operate its graphical user interface "GUI" which is intuitive to the user to set the VLD unit and dispensing settings.

It should be appreciated that the above noted VLD1 and VLD2 are example embodiments of salon management devices. Each feature discussed for each device can be used by other devices, and additional similar features are within the spirit of the disclosure discussed herein.

VLD GUI: stands for Graphical User Interface. It is an interface that is used to issue commands to a computer. In this case the operator uses the GUI, by means of the LCD touchscreen, to manipulate and activate onscreen images. This is the interface that dispenser operators will use to tell the dispenser how much product they need, etc. The GUI then relays that information via Smart Logic to the Microprocessor board which then dispenses the powder. Smart Logic is the firmware (the permanent software programmed into the computer) used to communicate between the GUI and the Microprocessor Board.

VLD Microprocessor Board: This microprocessor board is one component that can assist, in some embodiments, with the dispensing of a desired amount of product. The product will go through a vibration section to avoid packing or clumping to the powder chute, then onto a screw conveyor powered by a stepper motor controlled by microprocessor, the powder is evenly transferred by the screw and onto second chute which directly leads to the dispensing nozzle. The dispensing nozzle dispenses powder into the powder cup positioned by operator. The electronic scale underneath the powder cup will measure the amount desired in OZ OR GRAMS then signal machine to stop once desired amount reached. During this process, an LED light comes on to signal machine is "in progress." Then the data is transferred wirelessly via intranet to a server where it will be stored and managed through a smart algorithm.

Figure 4:
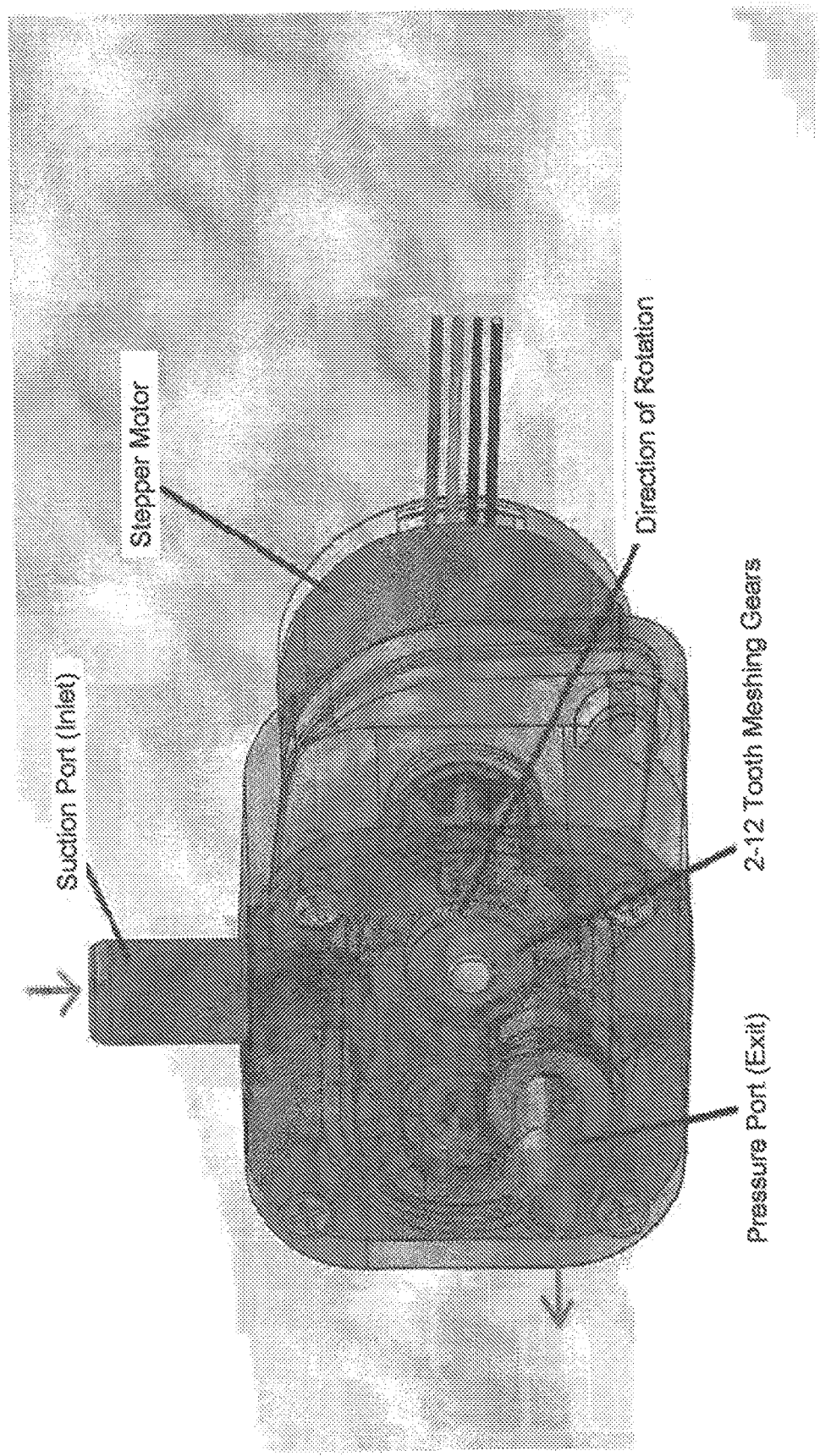
FIG. 4 illustrates different embodiments of an external gear pump for viscous liquid dispensing in a VLD system.

FIG. 4 illustrates different embodiments of an external gear pump for viscous liquid dispensing. An external gear pump shown uses (2) 12-tooth spur gears made of PEEK thermoplastic. One gear being directly driven by a stepper motor and the other gear being an idler gear. The meshing of the two gears creates pressure, allowing fluid to flow from one direction to the other. External gear pumps are a fixed displacement pump, such pumps being commonly used for precision dispensing in medical equipment.

Being a fixed displacement pump, and having 12 tooth gears means that this pump will dispense a known amount of fluid per $\frac{1}{12}$th revolution. The stepper motor powering the pump uses feedback technology allowing precision rotation which will be determined by the amount of fluid needed.

For some embodiments, the materials used to build the pumps were chosen based on the chemical resistivity needed. The developer solution contains hydrogen peroxide, potassium hydroxide, mineral oil, Cetearyl alcohol, and sodium benzoate, which demands high quality, chemically resistive thermoplastics, alloys, and rubbers.

The orientation in which the pump will be placed in the dispenser calls for a vertical suction port, allowing easy priming of the pump, and a horizontal pressure port which allows an easy exit of the fluid.

Example Materials used in some embodiments: Pump housing: 3003 Aluminum Alloy. Excellent across the board in machinability, formability, strength, and chemical resistance. Gears: PEEK (polyetheretherketone). Engineering thermoplastic used in precision parts requiring high stiffness, low friction, and excellent dimensional stability, along with excellent chemical resistance. Seals: Kalrez rubber: Chemically resistant to wide range of chemicals. In some embodiments, resistance includes resistance to chemicals used in, for example, Schwarzkopf Igora Royal Developer products.

Networked Portioning Powder Dispenser

Figure 5:
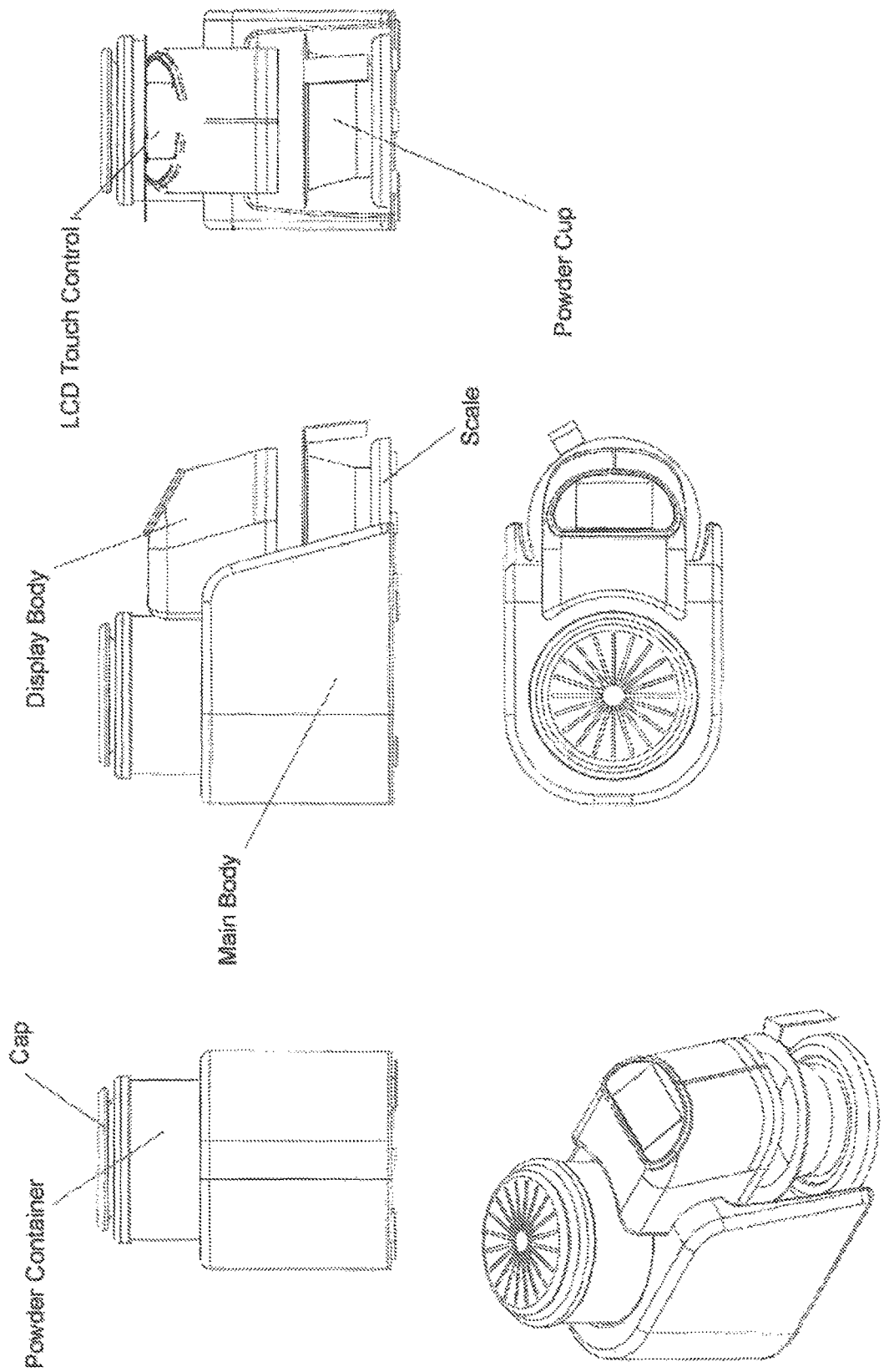
FIGS. 5 and 6 illustrate a networked powder dispenser, according to some embodiments.
Figure 6:
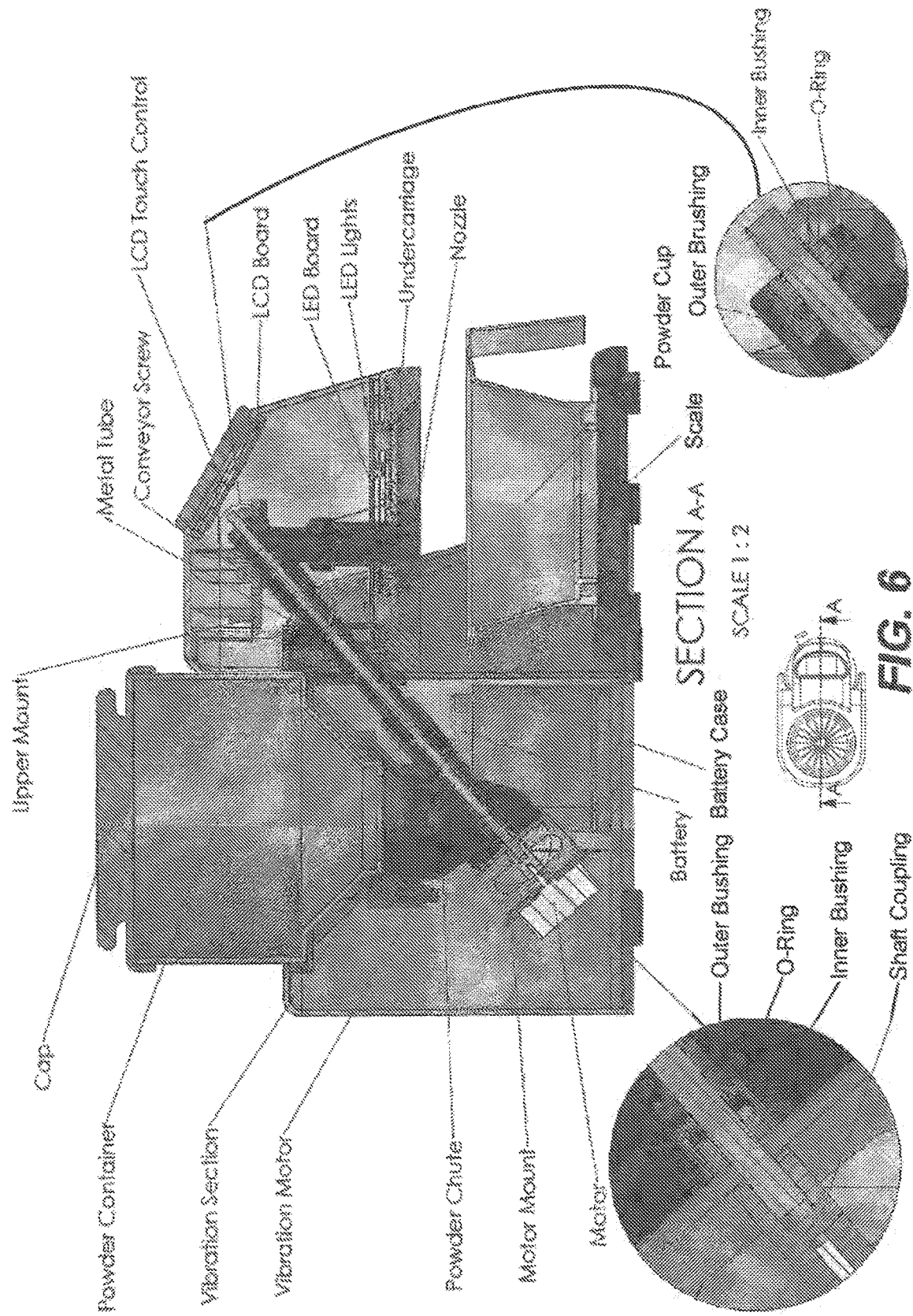

FIGS. 5 and 6 illustrate embodiments of a powder dispenser. Some embodiments implement a Smart Countertop Powder Dispenser for Hair Salons.

In an embodiment, a networked powder dispenser is designed to be used primarily for dispensing powdered products in hair salons. Specific features are included that are beneficial for applications in the hair salon industry. Different types of features include: variability and programmability, its built-in intelligence, ability to monitor amounts of powder dispensed to individual customers, network sharing of dispending data, the touch screen guided user interface (or GUI), and its wireless and power technology.

Embedded Technology:

The dispenser is programmable so that the user may set desired amounts to be dispensed based on specific needs. And because of the wireless interfacing scale, the set amounts can be very specific.

The dispenser has smart logic built in to its microprocessor. The dispenser will have a target amount of powder to dispense, and will self-adjust as necessary when that amount is being reached. This self-adjustment includes having information associated with the progress toward the target amount. Some embodiments can adjust dispensing speed and other characteristics during the dispensing process to improve the dispensing, e.g., speed, accuracy, and/or other similar dispensing characteristics.

In some embodiments, the dispenser communicates electronically with a scale, the scale measuring the weight of the product dispensed. This communication can improve speed and accuracy.

In some embodiments, the dispenser software can also acquire and store data as it is used. Using radio frequency identification (RFID), the dispenser can log data for individual customers and employees. For example, if an employee is wearing his/her ID badge and using the dispenser, the dispensing performed by the employee can be logged. If this employee is working with a customer, this can be manually entered, and/or determined by the system by looking at time/appointment records, or other data retrieval approaches.

Some embodiments network many dispensers throughout a hair salon, and store data associated with each dispensing event in one or more databases. This stored data can allow reports to be generated to show how much product one has used throughout the hour, day, week, etc., which employees used which products, which customers received which products, etc. Some embodiments use Wi-Fi, near field communications, wiring, etc., to connect to the salon network.

Other applications for this dispenser data include real-time alerts generated based on products needing to be replenished, unauthorized use of a dispenser, and/or other real-time applications.

In some embodiments, a countertop dispenser is used by any employee of the salon. Controls operating one or more dispensers can be located on the dispensers themselves (e.g., a GUI) and/or using other approaches, such as smart-phone operation (e.g., an employee uses an app connected to dispensers and the data system), voice-control (employee controls dispenser by voice-recognition), gesture control, etc. A centralized approach can also be used, where multiple dispensers are controlled centrally.

Power Source:

In some embodiments, the dispenser and scale will be battery operated. Some embodiments will feature wireless charging capabilities for the sake of tidiness and versatility, and some embodiments can be plugged into a standard electrical outlet. In some embodiments, the dispenser and scale will have batteries that charge wirelessly on a charging pad.

The Dispensing Mechanism:

The dispenser has a removable hopper container that holds the desired powder. The hopper is connected to a chute that has a smart software control sonic vibrator that is mounted to the chute to avoid "packing" or clumping of fine powders. The dispenser uses a screw conveyor the screw conveyor powered by a microprocessor controlled stepper motor. As the stepper motor rotates the screw conveyor, the powder will be evenly transferred by the screw and into a second chute which leads directly to the dispensing nozzle dispensing to the smart scale.

Additional Embodiments

The bulleted list item shown below are meant to be non-limiting characteristics of some embodiments. Similar features to some of the items below should be considered within the scope of the invention.

Network monitoring allows tracking of amounts of substances (e.g., harmful chemicals) that employees and/or customers are exposed to.

Monitoring mixes of color for customers—Having a precise measurement of color ingredients stored allows colors to be quickly remade for employees (wanting to duplicate a color for multiple customers) and/or customers (wanting the same, or a variation of a past color)

Automatic redo of mixed colors

Matching of existing colors

Interface with scheduling system that knows color/conditioning/haircut renewal timeline Monitoring potentially harmful combinations of chemicals in the salon. Avoiding, warning of these combinations.

The VLD1 charges wirelessly.

A color LCD and touch is used to configure the liquid dispenser.

VLD1 measure in OZ and GRAMS.

VLD1 comes apart for easy cleaning.

VLD2 is a shampoo and conditioner pump that has a preset amount.

VLD2 charges wirelessly.

The dispenser uses a RFID reader to manage and track user of the dispenser.

The dispenser uses wireless communication to send and receive data and manage the dispenser.

VDL is able take different shape bottles

Pump comes apart for easy cleaning

Industrial grade can stand up to heavy use

Accuracy of measuring options.

Led lights shows when pump in use

Powder dispenser

Vibrating feature prevents powder from clogging—Vibration can be tuned based on product, the amount of product that remains in a container, and/or other characteristics.

Powder is delivered on a screw, with a reverse feature for cleaning

Comes apart for easy cleaning

Build in scale reads Oz and grams

Tap feature to get desired consistency

Interactive

Led light to show dispenser in use

Numbered List of Example Embodiment Characteristics

Paragraph 1: A High Density Powder Dispenser comprising of any of the following electronic devices; printed circuit boards with a microprocessor, wireless communication, color Liquid Crystal Display "LCD" with Touch panel, power managing circuit, optical sensor, accelerometer sensor, RFID reader circuit, data storage media, wireless charger, power storing module and RF antenna.

Paragraph 2: The system as set forth in paragraph 1 wherein the housing A color LCD and touch is used to configure the liquid dispenser.

The system as set forth in paragraphs 1 and 2 wherein the housing of the dispenser a color LCD and touch is used to configure a powder dispenser via a graphical user interface GUI.

The system as set forth in paragraph 1 wherein the dispenser uses a microprocessor to manage dispensing and store data.

The system as set forth in paragraph 1 wherein the dispenser uses a RFID reader to manage and track user of the dispenser.

The system as set forth in paragraph 1 wherein the dispenser uses a storage module to captured log data of the dispenser.

The system as set forth in paragraph 1 wherein the dispenser uses wireless communication to send and receive data and manage the dispenser.

The system as set forth in paragraph 1 wherein the dispenser uses optical sensor to monitor, log and manage material.

The system as set forth in paragraph 1 wherein the dispenser uses accelerometer sensor is used to monitor and log dispense handling by user.

The system as set forth in paragraph 1 wherein the housing A wireless receiver circuit is used to charge the power storing module and receive control signals.

The system as set forth in paragraph 1 wherein the housing houses a rechargeable electrical power storing module, the power storing module constituting a source of potential for the printed circuit boards and conveyer motor or any parts that requires electrical power.

A powder dispenser that monitors the media in its hopper via a microprocessor sensor.

A dispenser that uses a microprocessor to monitor and activate a vibration modules to activate movement of the media.

A dispenser that uses wireless charging to charge its power storing module.

A dispenser that uses firmware to run smart algorithmic programs.

The dispenser uses a RFID reader to manage and track user of the dispenser.

The dispenser uses a microprocessor to manage dispensing and store data.

The dispenser uses wireless communication to send and receive data and manage the dispenser.

Example Computer System Implementation

Figure 7:
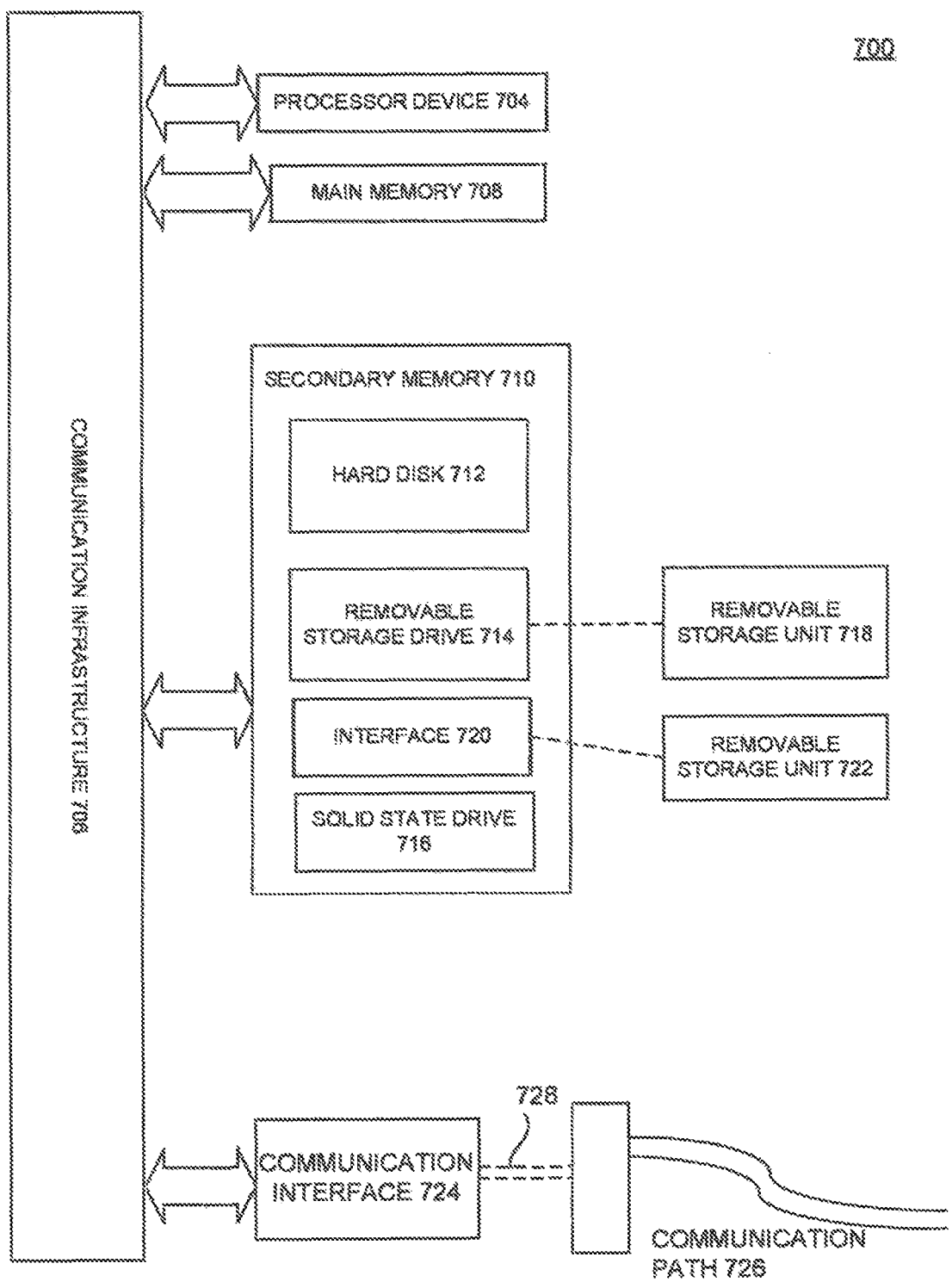
FIG. 7 is an example computer system that is a part of some embodiments
Figure 8:
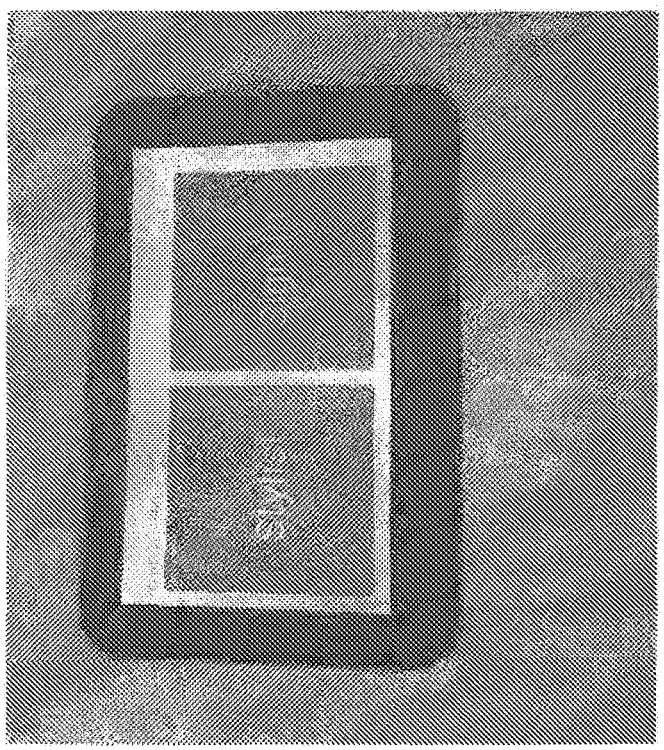
FIGS. 8-14 depict examples of a kiosk system for salons, according to some embodiments.
Figure 9:
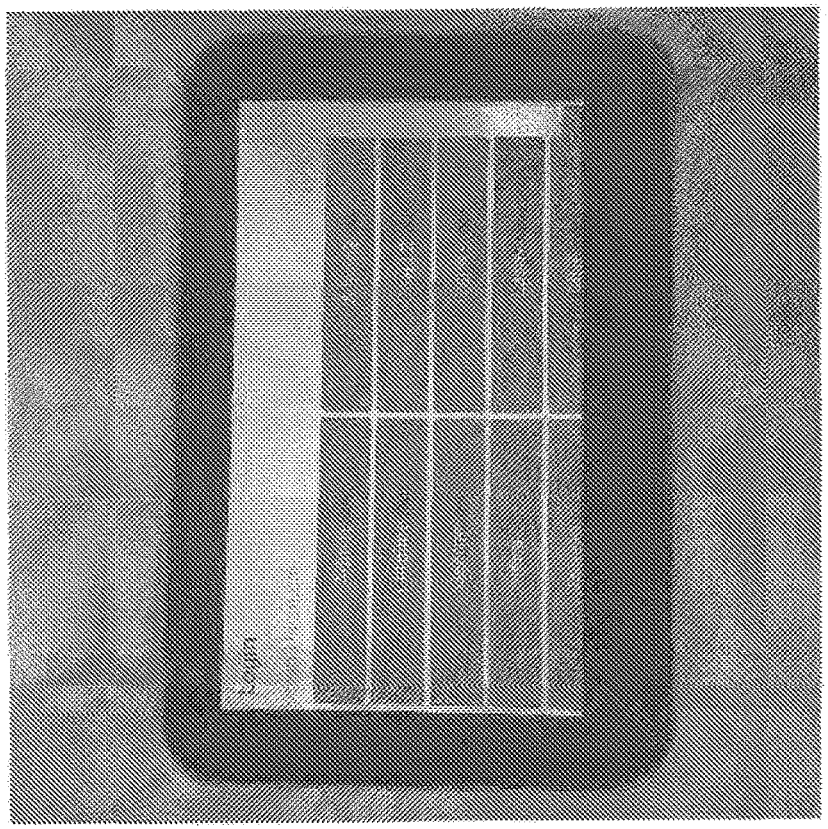
Figure 10:
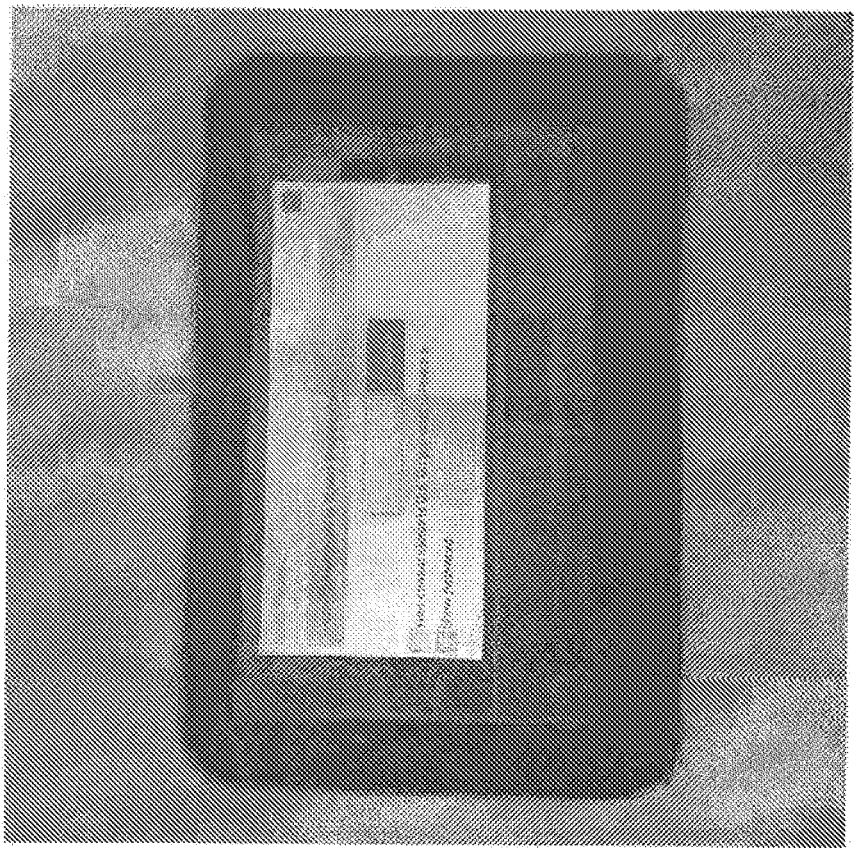
Figure 11:
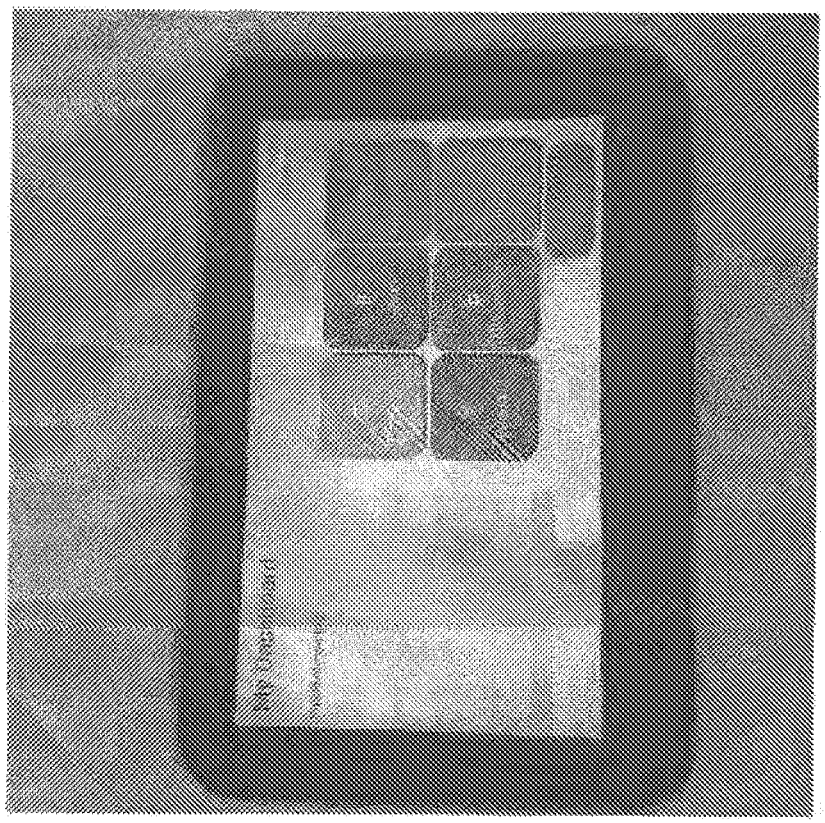
Figure 12:
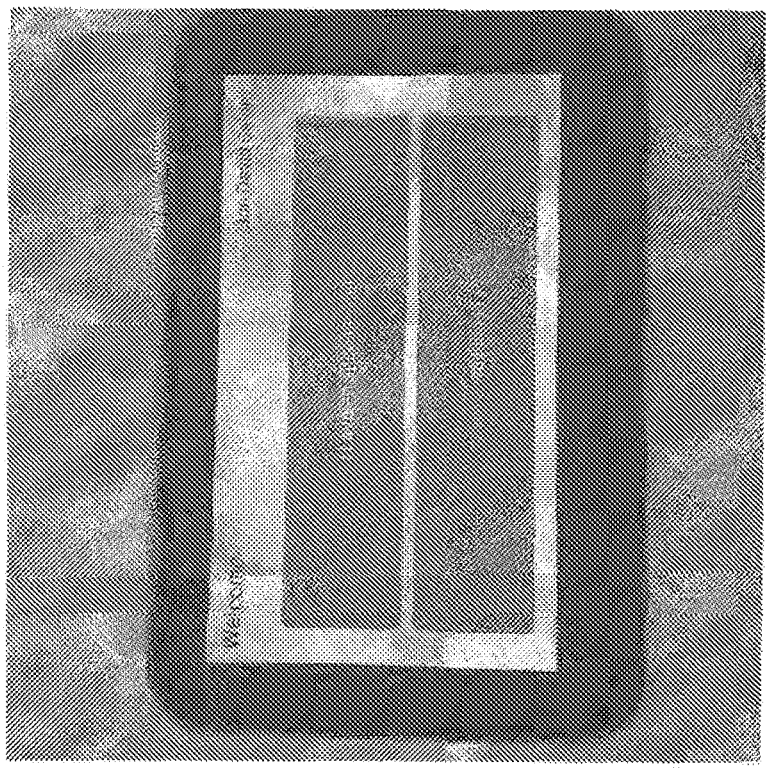
Figure 13:
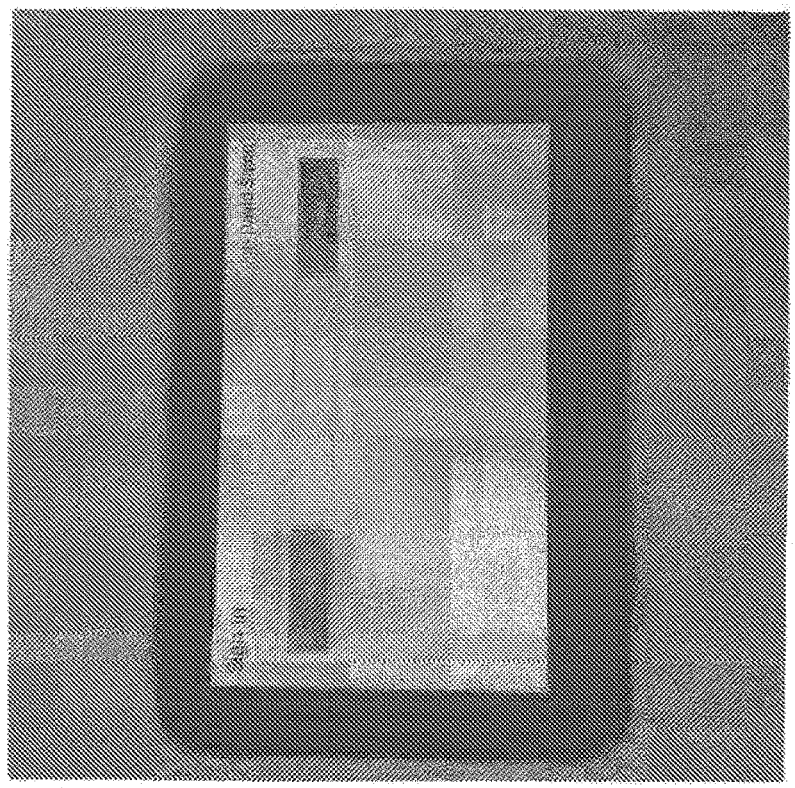
Figure 14:
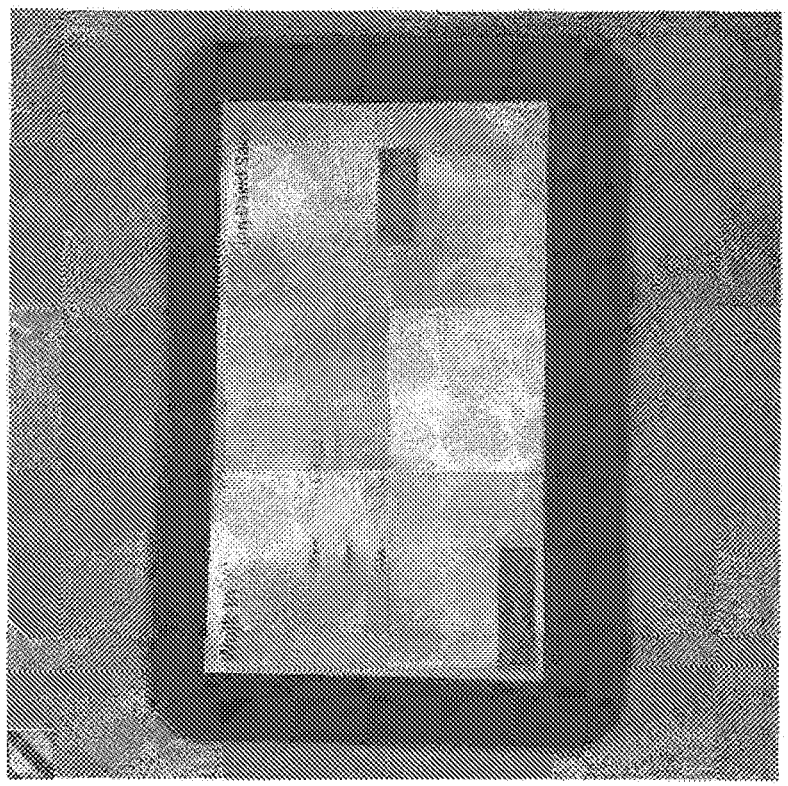
Figure 15:
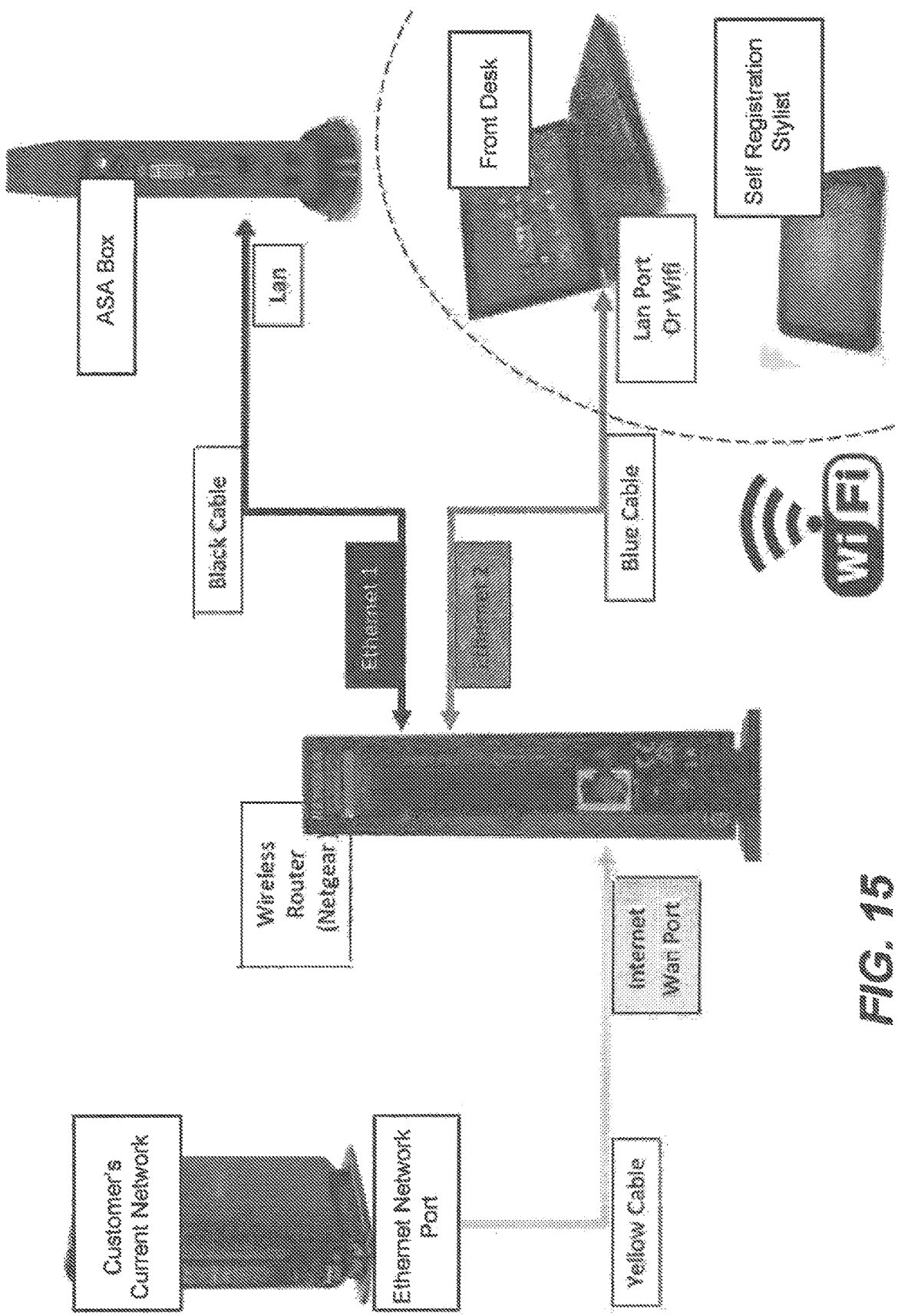
FIG. 15 is another example computer system that is a part of some embodiments.
Figure 16:
FIGS. 16-25 depict additional examples of a kiosk system for salons, according to an embodiment.
Figure 17:
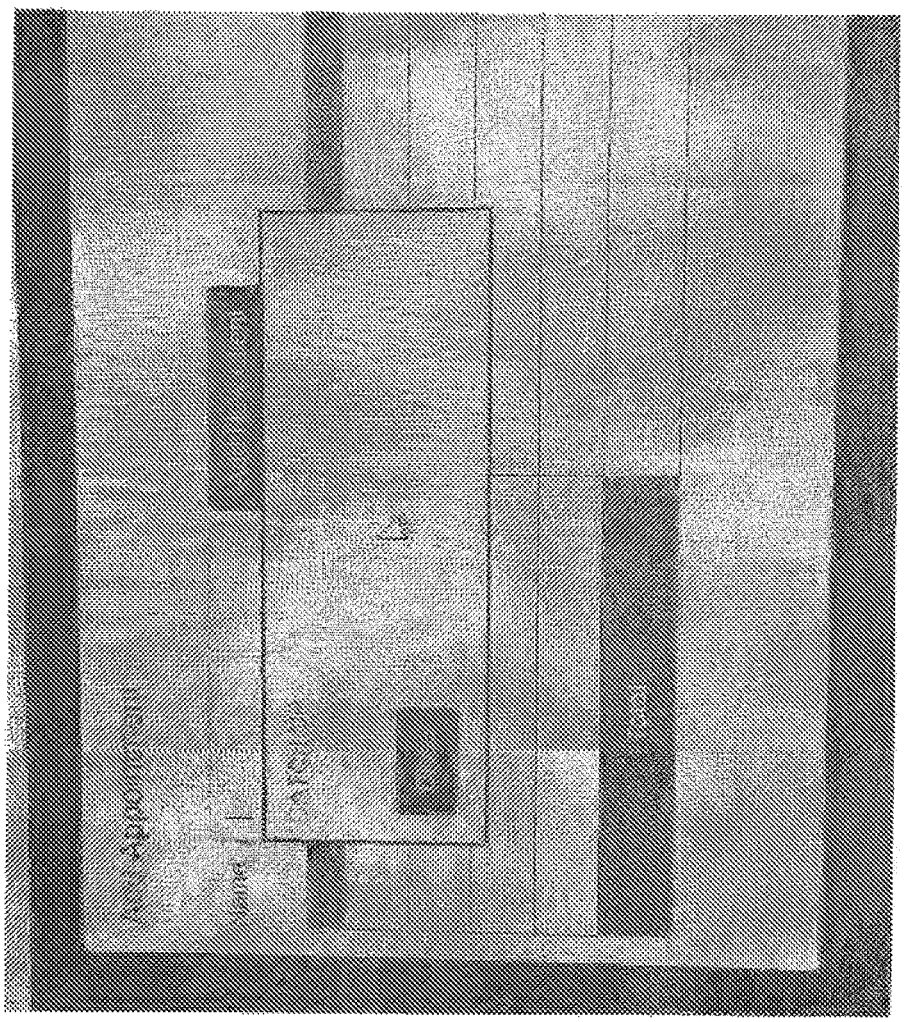
Figure 18:
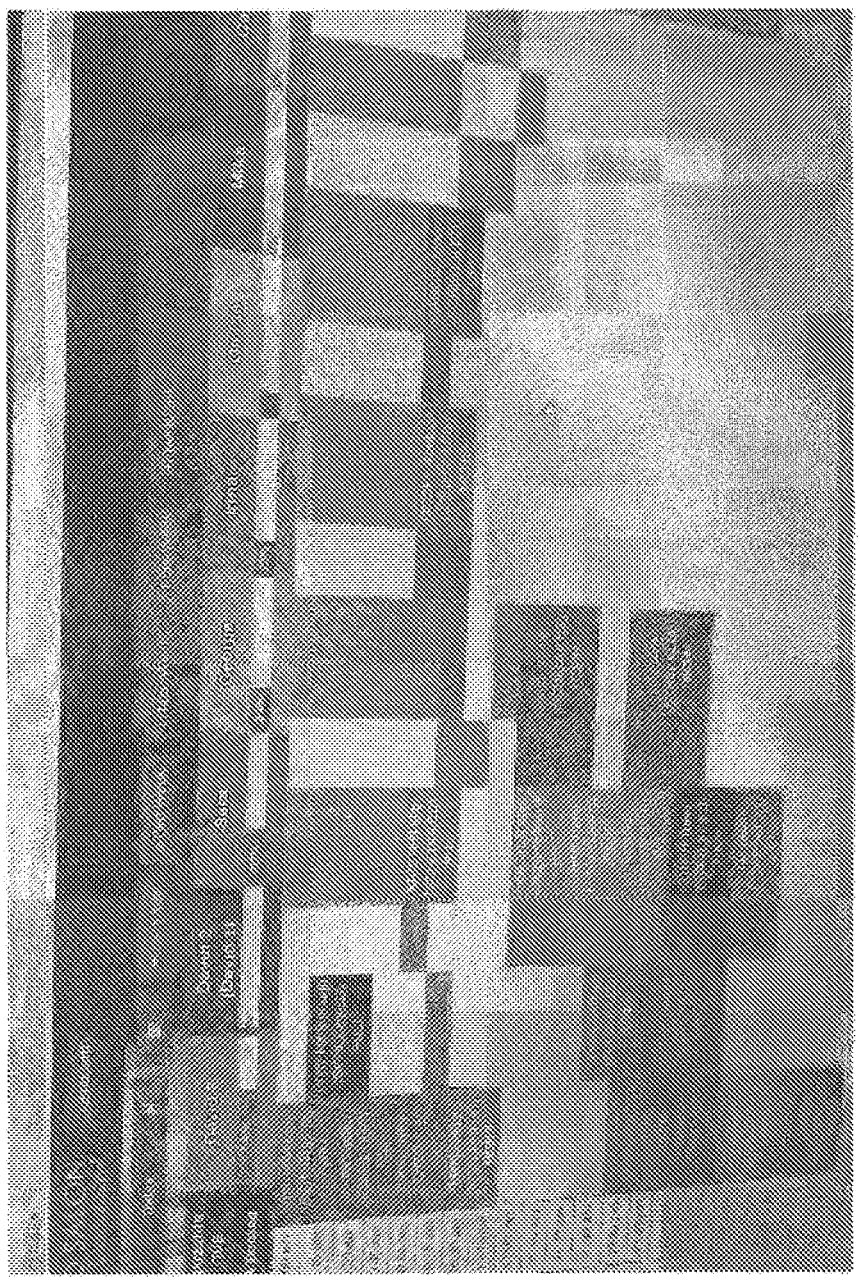
Figure 19:
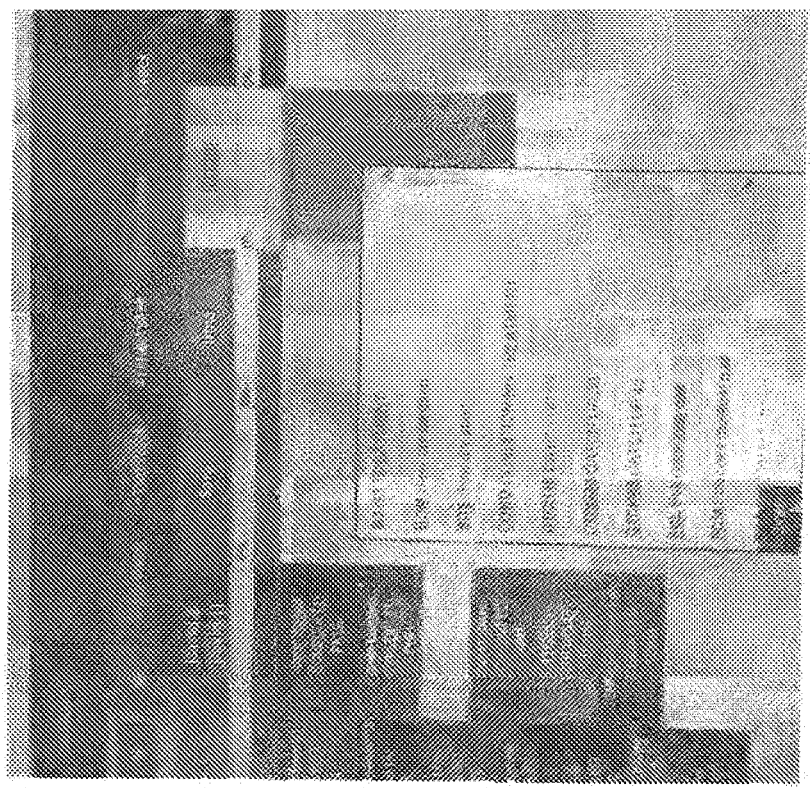
Figure 20:
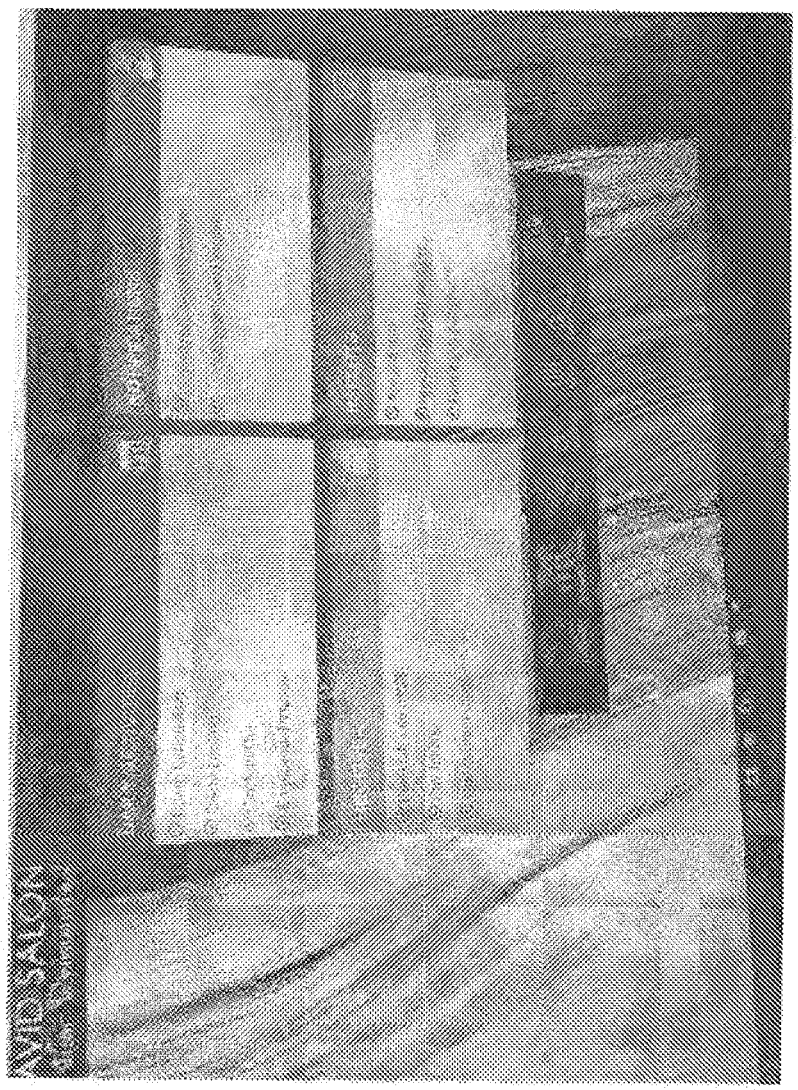
Figure 21:
Figure 22:
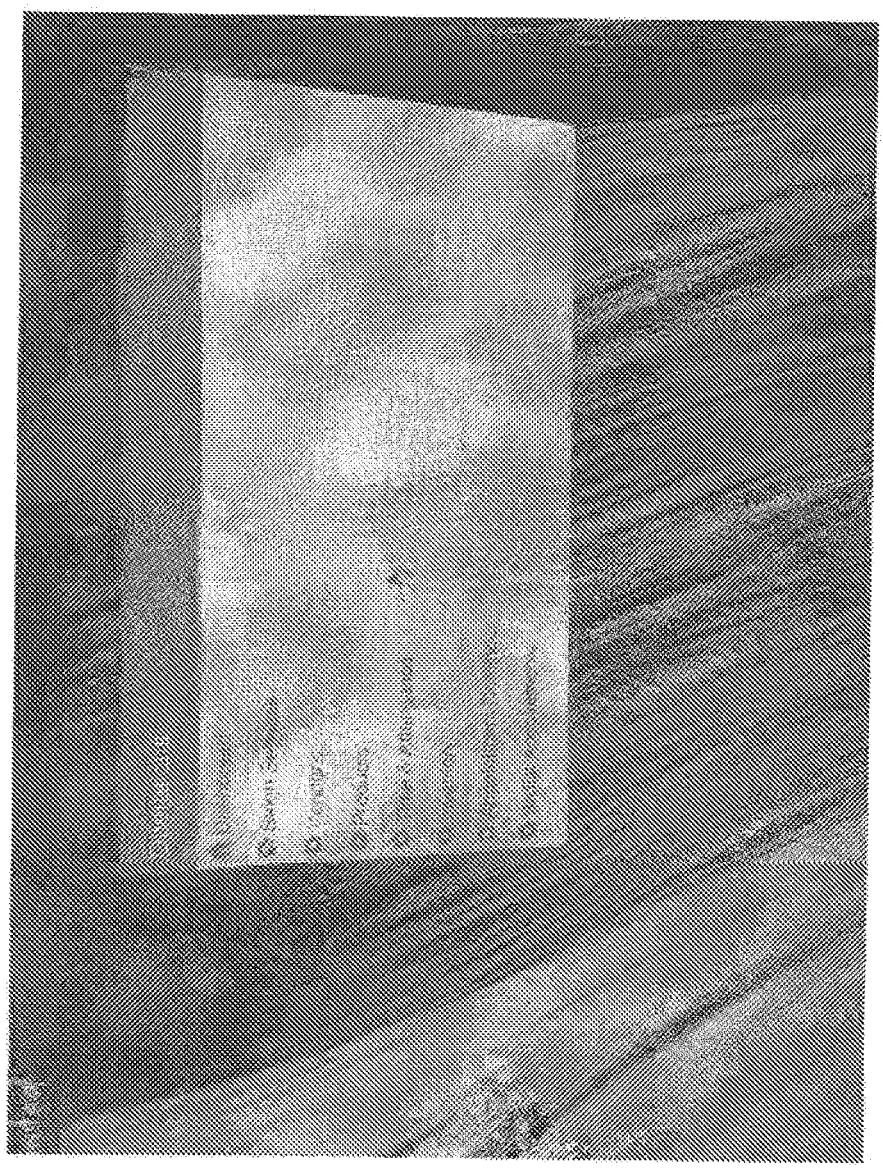
Figure 23:
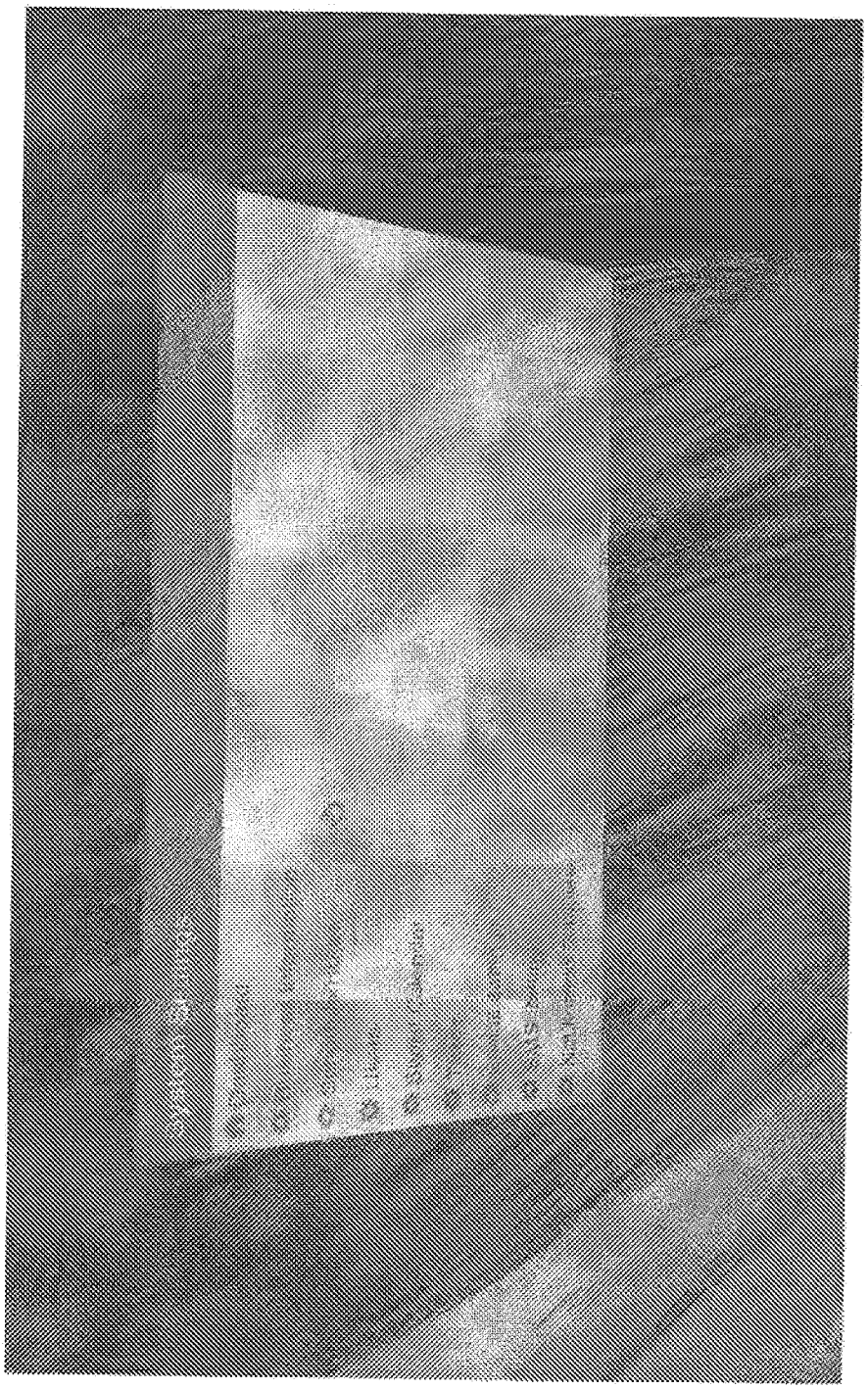
Figure 24:
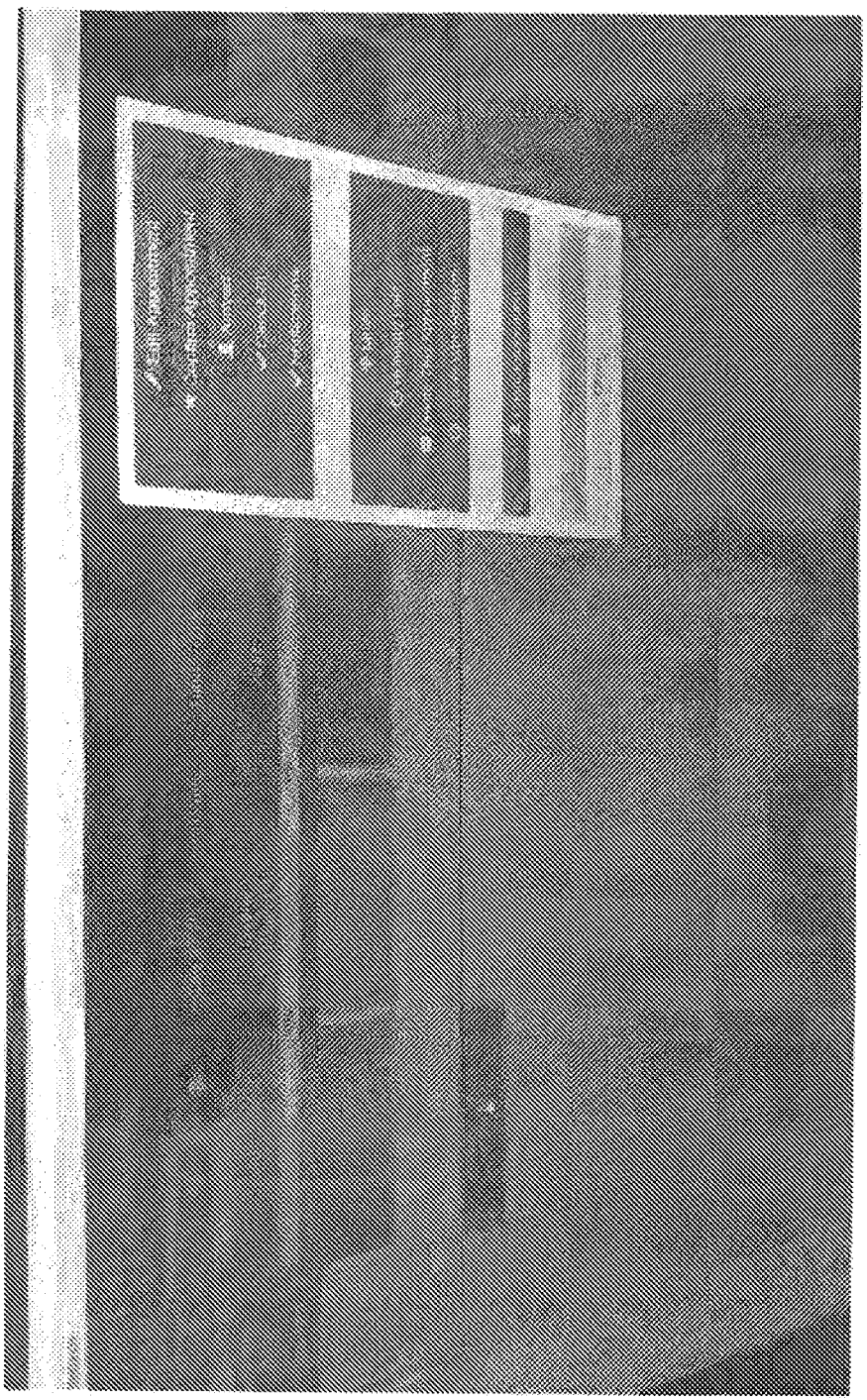
Figure 25:
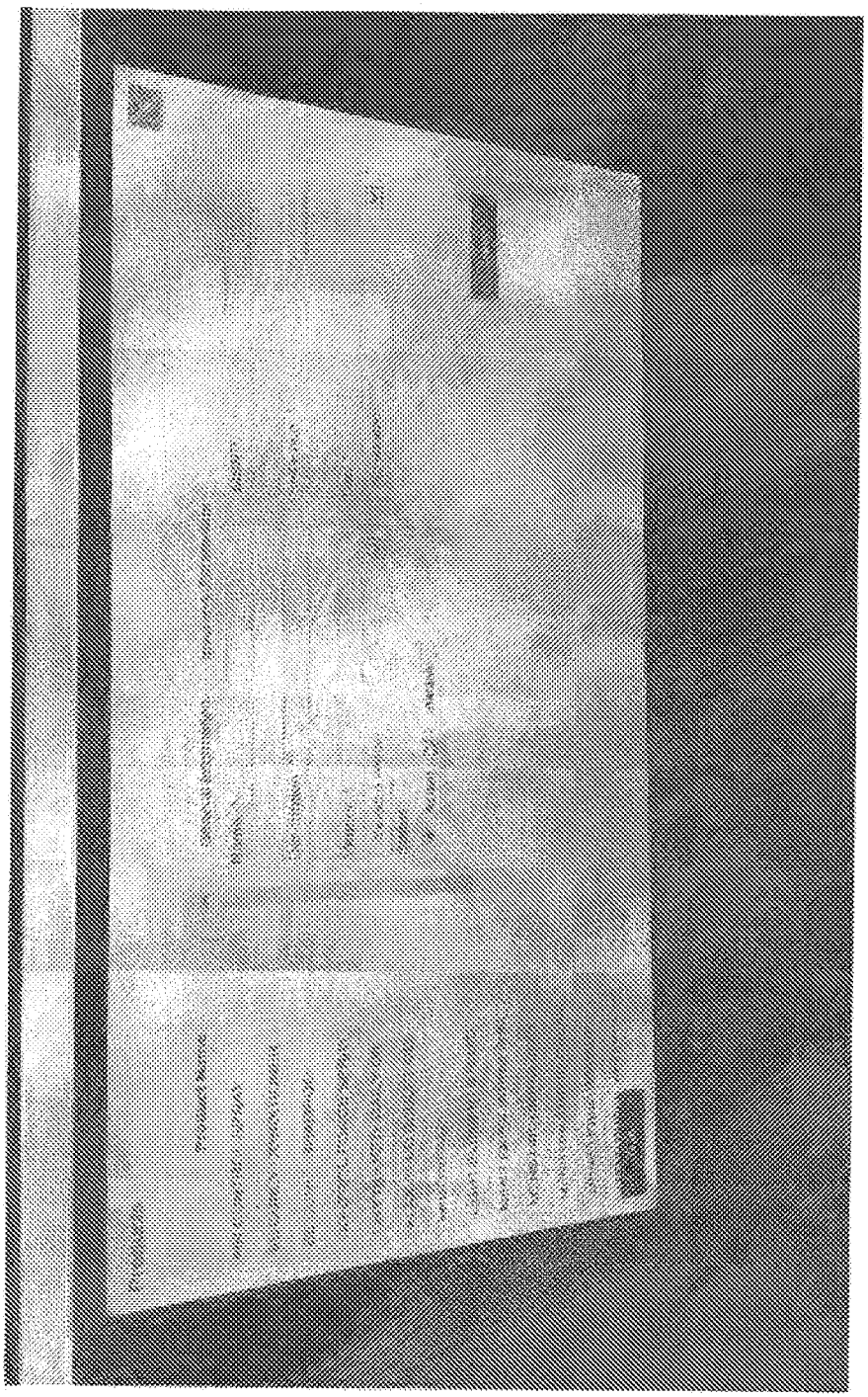

FIG. 7 illustrates an example computer system 700 in which embodiments, or portions thereof, may be implemented as computer-readable code. As discussed further below, computer system 700 can be used to implement embodiments shown in FIGS. 26 and 27. For example, portions of systems or methods discussed for networked salon management may be implemented with computer system 700 using hardware, software, firmware, tangible computer readable media having instructions stored thereon, or a combination thereof and may be implemented in one or more computer systems or other processing systems. Hardware, software or any combination of such may embody any of the modules/components in FIG. 7.

One of ordinary skill in the art may appreciate that embodiments of the disclosed subject matter can be practiced with various computer system and computer-implemented device configurations, including smartphones, cell phones, mobile phones, tablet PCs, multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor 'cores.'

Various embodiments are described in terms of this example computer system 1300. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As will be appreciated by persons skilled in the relevant art(s), processor device 1304 may also be a single processor in a multi-core/multiprocessor system, such system operating alone, or in a cluster of computing devices operating in a cluster or server farm Processor device 1304 is connected to a communication infrastructure 1306, for example, a bus, message queue, network or multi-core message-passing scheme.

Computer system 700 also includes a main memory 708, for example, random access memory (RAM), and may also include a secondary memory 710. Secondary memory 710 may include, for example, a hard disk drive 712, removable storage drive 714 and solid-state drive 716. Removable storage drive 714 may include a floppy disk drive, a magnetic tape drive, an optical disk drive, a flash memory, or the like. The removable storage drive 714 reads from and/or writes to a removable storage unit 718 in a well-known manner. Removable storage unit 718 may include a floppy disk, magnetic tape, optical disk, etc. which is read by and written to by removable storage drive 714. As will be appreciated by persons skilled in the relevant art, removable storage unit 718 includes a computer readable storage medium having stored therein computer software and/or data.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 700.

Computer system 700 may also include a communications interface 724. Communications interface 724 allows software and data to be transferred between computer system 700 and external devices. Communications interface 724 may include a modem, a network interface (such as an Ethernet card), a communications port, a PCMCIA slot and card, or the like. Software and data transferred via communications interface 724 may be in electronic, electromagnetic, optical, or other forms capable of being received by communications interface 724. This data may be provided to communications interface 724 via a communications path 726. Communications path 726 carries the data and may be implemented using wire or cable, fiber optics, a phone line, a cellular phone link, an RF link or other communications channels.

In this document, the terms "computer program medium" and "computer readable medium" are used to generally refer to media such as removable storage unit 718, removable storage unit 722, and a hard disk installed in hard disk drive 712. Computer program medium and computer readable medium may also refer to memories, such as main memory 708 and secondary memory 710, which may be memory semiconductors (e.g., DRAMs, etc.).

Computer programs (also called computer control logic) may be stored in main memory 708 and/or secondary memory 710. Computer programs may also be received via communications interface 724. Such computer programs, when executed, enable computer system 700 to implement the present invention as discussed herein. In particular, the computer programs, when executed, enable processor device 704 to implement the processes disclosed, such as the stages in the method illustrated by flowchart 2700 of FIG. 27 discussed below and system 2600 discussed below. Accordingly, such computer programs represent controllers of the computer system 700. Where embodiments are implemented using software, the software may be stored in a computer program product and loaded into computer system 700 using removable storage drive 714, interface 720, hard disk drive 712 or communications interface 724.

Embodiments also may be directed to computer program products compnsmg software stored on any computer useable medium Such software, when executed in one or more data processing devices, causes a data processing device(s) to operate as described herein. Embodiments employ any computer useable or readable medium Examples of computer useable mediums include, but are not limited to, primary storage devices (e.g., any type of random access memory), secondary storage devices (e.g., hard drives, floppy disks, CD ROMs, ZIP disks, tapes, magnetic storage devices, and optical storage devices, MEMS, nanotechnological storage device, etc.).

Networked Hair Salon Product Dispensing

Figure 26:
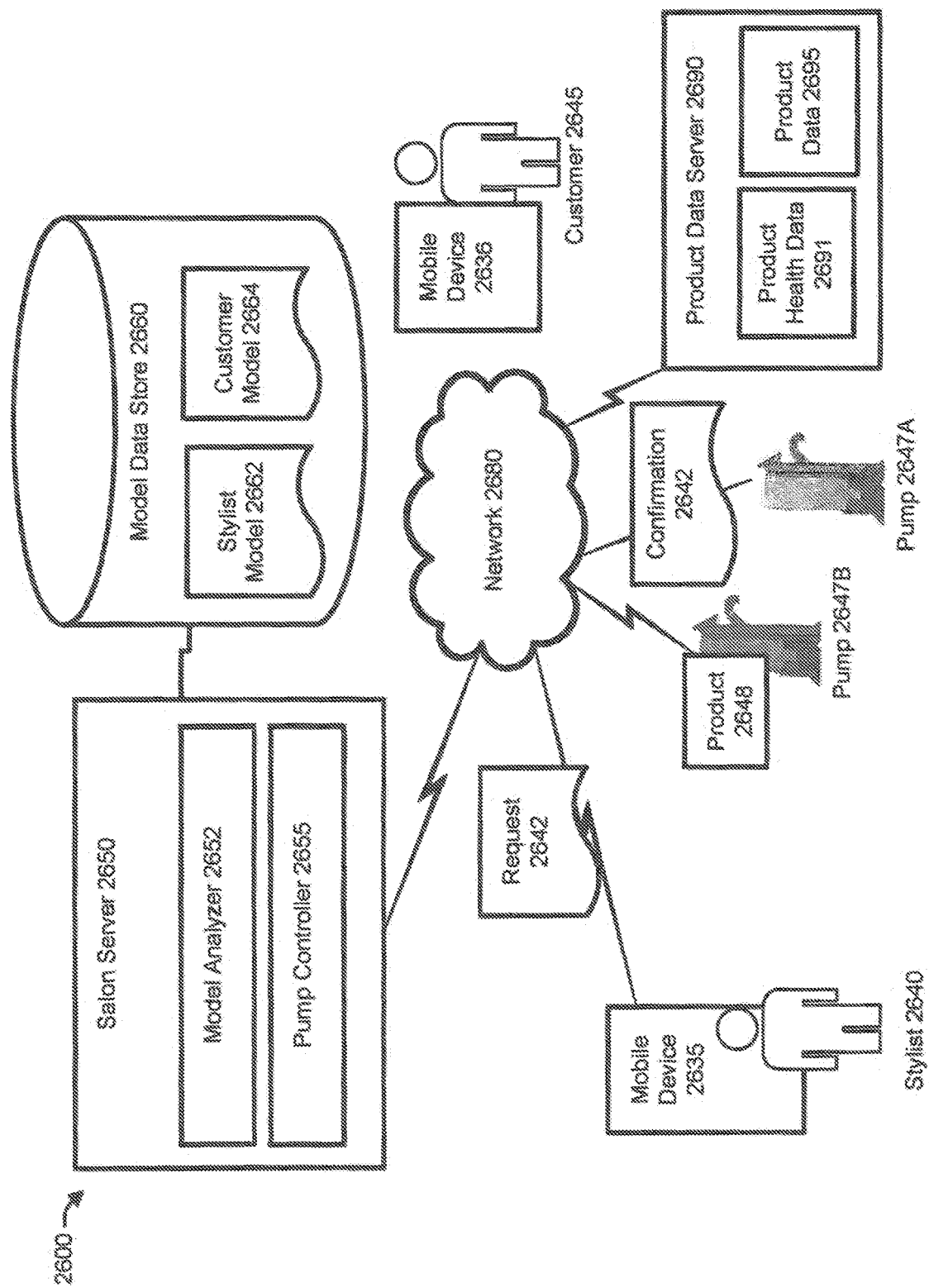
FIG. 26 is a diagram of depicting portions of a system for coordinated distribution of hairstyling products using automatic pumps connected over a computer network.

FIG. 26 depicts an example of an embodiment of a system 2600 for coordinated distribution of products 2648 (e.g., hairstyling products) using automatic pumps 2648A-B connected over a computer network 2680. Distribution of products 2648 is based on request 2642 for customer 2645. System 2600 further includes salon server 2650 having model analyzer 2652 and pump controller 2655, and coupled to model data store 2660. As used herein, the term "pump" can broadly mean any apparatus that dispenses salon products (e.g., powder, cream, gel, spray, wax, pomade, gel, volumizer, shampoo, conditioner, etc.). Examples of networked product pumps are described above, but these descriptions are non-limiting.

In some embodiments, customer 2645 is a customer requesting services from a hair salon. In some embodiments, customer 2645 is modeled by a complex data structure (e.g., customer model 2664) that models their interactions with components including product 2648 and stylist 2640. Having customer model 2664 can provide embodiments with a rich source of data upon which analysis can be performed and beneficial results (e.g., protecting from product interactions, excessive product exposure, etc.) discussed below, can be yielded. In some embodiments, using complex customer model 2664, along with network product dispensation (e.g., using pumps 2647A-B) results in improvements, using processes that are performed by a computer, to a variety of hair salon processes, some of which are discussed below.

In an example embodiment, customer 2645 requests a service from stylist 2640 (e.g., a color application). Stylist 2640 interacts with salon server 2650 (e.g., by generating a request 2642). In some embodiments, request 2642 is generated by mobile device 2635 after stylist 2640 simply enters the service requested (e.g., color hair a color shade). It is worth noting that, in this example, no specific products are specified, only the service requested. Upon receiving this service request, salon server 2650 determines which products are required, and uses pump controller 2655 to request dispensation of one or more products from pumps 2647A-B. In another example, request 2642 is a request for specific products, not just the services. As discussed below, some embodiments can analyze requests for specific products and automatically provide dispensation of substitute products to achieve a result (e.g., protecting from unhealthy exposure to chemicals, maintaining stock levels of certain products, etc.).

In some embodiments, salon server 2650 can determine an amount of product to use based on different factors. Hair colors, for example, can require two or more products 2648, and the respective amounts can be selected by either salon server 2650 or stylist 2640. When selecting the product to distribute, as well as the amount of a product, some embodiments retrieve a color combination that was previously used by customer 2645, as stored in customer model 2664.

One having skill in the relevant art(s), given the description herein, would appreciate how some embodiments can select combination of colored products 2648 based on calculations of color mixtures to achieve certain colors. One way a color could be selected by embodiments could be using a camera (in mobile devices 2635, 2636, a kiosk in the salon), such camera being directed at a chosen color (e.g., in a magazine, or a live picture of colored hair). Another approach used by some embodiments could be for a color name to be entered (e.g., burnt umber), or for color codes to be used (e.g., RGB values). Once salon server 2650 receives a chosen color, amounts of one or more color products 2648 can be selected, and pump controller 2655 can direct pumps 2647A-B to dispense products 2648 for use by stylist 2640. As discussed further below, additional factors can influence the products and amounts of products selected by salon server 2650.

Logging and Use of Dispensed Product Amounts

As discussed above, some embodiments enable the networked control of product dispensation apparatus (e.g., pumps 2647A-B) to dispense automatically determined products and amounts for selected hair salon services. In some embodiments, the amount each product dispensed by pumps 2647 is confirmed by confirmation 2642 message being relayed to salon server 2650. Some embodiments also track how each product was handled by stylist 2640 (e.g., with or without gloves, breathing of products with or without a respirator), and applied to customer 2645 (e.g., to hair, skin, nails, etc.). At salon server 2650, confirmation 2642 can be used to update models stored in model data store 2660 to change the models based on their exposure to products 2648.

In some embodiments, each product dispensed for, and used on customer 2645 is described by specific values (e.g., amount, product, way used/applied), and these values are used to update customer model 2664. For example, certain studies have determined that some hair products (e.g., products containing phthalates, formaldehyde, etc.) may be broadly dangerous to certain groups, while other chemical ingredients only cause problems for specific individuals.

Some embodiments of salon server 2650 retrieve product information from external computer data servers (e.g., product data server 2690) and use this information to assess potentially harmful effects of products 2648 dispensed. In some embodiments, salon server 2650 can be configured to prevent the use of certain harmful products, while in other embodiments, the use of certain products can be monitored for bother stylists 2640 and customers 2645.

In an example: When customer 2645 has a product (A) dispensed by pump 2648 for use in a salon service, the amount of this product (e.g., 3 oz) is relayed to salon server 2650, along with how the product was applied, e.g., on hair and scalp. Salon server, having retrieved information about product (A) from product data 2695 stored in product data server 2690, determines that the 3 ounces applies results in 300 milligrams of a chemical (X) being applied to the hair and scalp of customer 2645. Because the health impact of chemical (X) has been retrieved from product health data 2691, certain recommended exposure values for chemical (X) can be determined (e.g., for both stylist 2640 and customer 2645). Customer model 2664 can be updated to register the change in customer 2645 due to exposure (e.g., the customer now being estimated to only be able to safely be exposed to 600 more milligrams of chemical (X) in the next year). This exposure information can be broadly used by embodiments for different automatic functions, e.g., preventing the use of a product where exposure is over a particular level, automatic selection of alternative products based on the selection of a service (if the same service is selected by customer 2645, a product without chemical (X) can automatically be selected for dispensation).

Continuing this example, stylist model 2662 may also be updated based on the use of product (A) and chemical (X). In some embodiments, stylist 2640 works with and is exposed to product 2648 after product 2648 is distributed from a pump 2647A. Stylists 2640, in a way similar to that described for customer 2645 above, may also have exposure levels tracked by some embodiments, but stylists can have automatic reminders generated by some embodiments to remind about the use of protective gear (e.g., gloves, masks, etc.) for certain products. In some embodiments, when a product is applied by a stylist, the protective gear used during application by stylist 2640 can also be relayed to salon server 2650 (e.g., by an application running in mobile device 2635), and these protections can be used to set threshold exposure levels (e.g., chemical (X) is estimated to be able to be safely used at a level of 600 mg/year without skin contact protection, but a level of 6000 mg/year is safe with skin contact protection). In some embodiments, the automatic selection of other products to be used can also be applied to the use by stylist 2640 over a period of time (e.g., select an alternative product when more than a certain amount of chemical (X) is used in a particular day, week, etc.).

As noted above, an RFID associated with stylist 2640 can be used to link stylist 2640 with a dispensing pump 2647. In some embodiments, this used of RFID and other similar technologies can also be used to establish what protective gear was used for a particular dispenses product, e.g., gloves, masks, respirators, etc., may have RFIDs that are read by pump 2647 thus enabling the automatic collection of this information for use by embodiments. One having skill in the relevant art(s), given the description herein, will appreciate how this automatic detection of the use of protective gear can help promote healthy use of the products by both stylist 2640, and customer 2645. In some embodiments, salon server 2650 can be configured to prevent the dispensation of products or combinations of products if protective gear is not detected. Similarly, to have product dispensed, salon server 2650 may gather the intended use of the product (e.g., on skin), and confirm (e.g., using models from model data store 2660) this the intended use of the product (by a specific stylist 2640, in a particular way, on a specific customer 2645) is valid.

In some embodiments, the interaction of products 2648 is monitored. For example, when product data 2695 (or any other source) indicates that products A and B, when combined in a particular way (the way the products are used once dispensed being included, for example, with confirmation 2642) could be harmful and/or ineffective, embodiments can be configured to be able to warn, prevent, and/or automatically select alternative products/amounts of products that perform similar functions.

In some embodiments, products 2648 can be dispensed that may not broadly cause problems to customers 2645, but may cause problems for individual customers. Mobile device 2636, running an application by customer 2645, can be used to gather preferences/heath requirements from customer 2645 and update customer model 2664 to reflect these characteristics of customer 2645. In some embodiments, as a benefit to stylist 2640, this ability to set preferences can be used by mobile device 2635 to update stylist model 2662 to reflect the characteristics of stylist 2640.

In some embodiments, the monitoring and automatic selection of products (and substitutes for products) can be applied to the optimization of product 2648 inventory in a salon. Salon server 2650, can have data that describes current inventory level of different products (both in pumps 2647, which have sensors that show remaining product), and in stock reserves. To help optimize the purchase and use of products 2648, inventory levels can be used as a value to control the selection of products and the amounts of products. For example, substitute products can automatically be selected based on a low in inventory value, products can be mixed to preserve the volume of one product by replacing with another, substantially equivalent product. In some embodiments, salon server 2650 can select the pricing of different procedures based on the inventories of products and the predicted use based on past use of the products.

Figure 27:
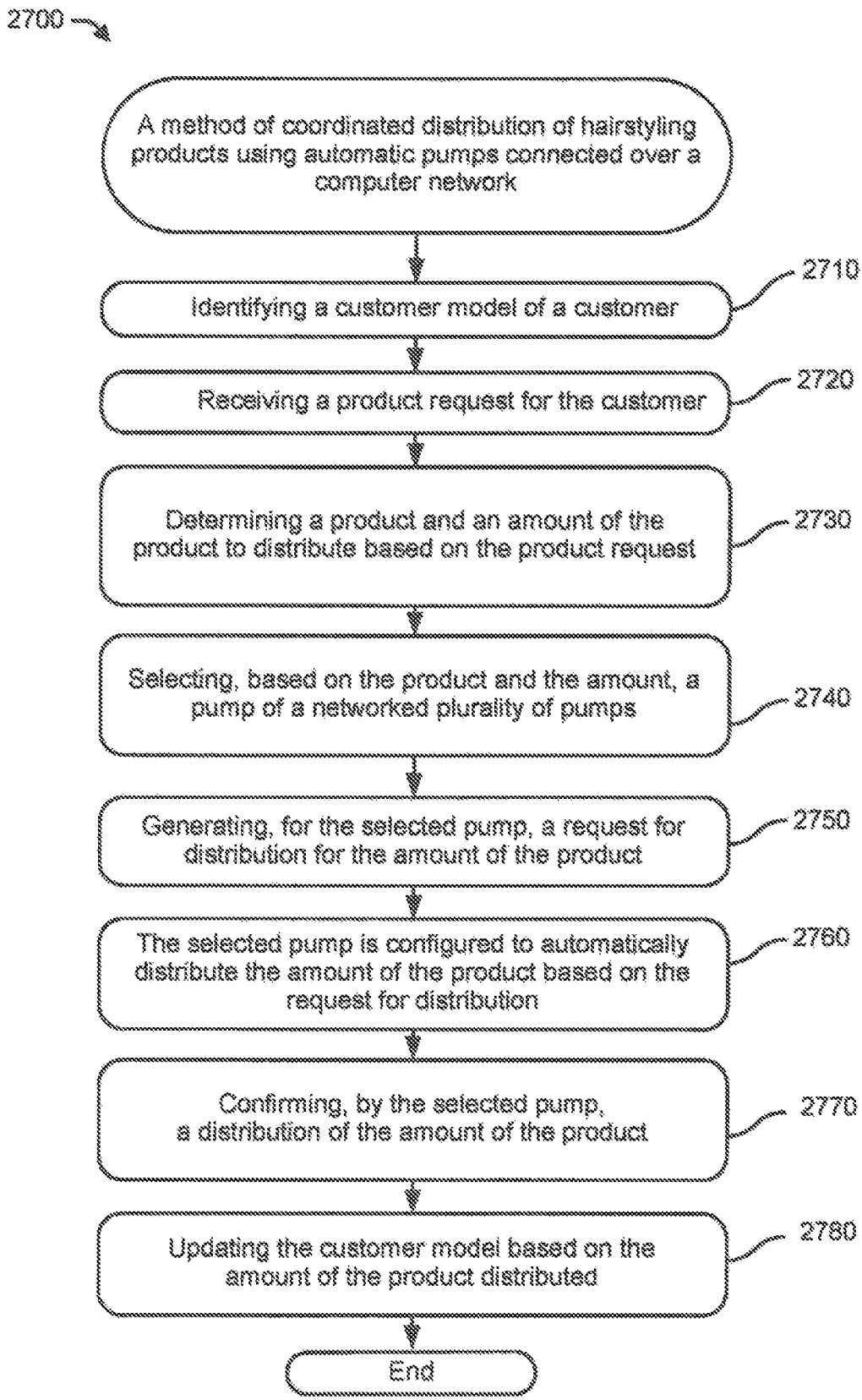
FIG. 27 is a flowchart depicting portions of a method of coordinated distribution of hairstyling products using automatic pumps connected over a computer network, according to some embodiments.

FIG. 27 depicts a flowchart of a method of coordinated distribution of hairstyling products using automatic pumps connected over a computer network. In 2710, a customer model of a customer is identified. In an example, a customer model (e.g., customer model 2664) is identified (e.g., identified by salon server 2650) for a customer (e.g., customer 2645).

In 2720, a product request is received for the customer. In an example, a product request (e.g., request 2642 for a hair color) is received for the customer (e.g., entered by stylist 2640, using mobile device 2635, for customer 2645).

In 2730, a product and an amount of the product are determined for distribution based on the product request. In an example, a product (e.g., product 2648) and an amount of the product are determined (e.g., by salon server 2650) for distribution based on the product request (e.g., request 2642).

In 2740, a pump of a plurality of networked pumps is selected based on the product and the amount of the product to be dispensed. In an example, a pump (e.g., 2647B) of a plurality of networked pumps (pumps 2647A-B, connected to salon server 2650 by network 2680) is selected based on the product (e.g., product 2648) and the amount of the product to be dispensed.

In 2750, a request for distribution is generated for the selected pump for the amount of the product to be distributed. In an example, a request for distribution (e.g., a product and amount are selected by salon server 2650 and relayed using network 2680) is generated for the selected pump for the amount of the product to be distributed (e.g., pump 2647B).

In 2760, the selected pump automatically distributes the amount of the product based on the request for distribution. In an example, the selected pump (e.g., pump 2647B) automatically distributes the amount of the product (e.g., product 2648) based on the request for distribution.

In 2770, the selected pump confirms the amount of the product that was distributed.
In an example, the selected pump (e.g., pump 2647B) confirms the amount of the product that was distributed (e.g., confirmation 2642 is relayed to salon server 2650).

In 2780, the customer model is updated based on the amount of the product that was distributed. In an example, the customer model (e.g., customer model 2664) is updated based on the amount of the product that was distributed (e.g., model analyzer 2652 analyzes customer model 2664 and updates the model based on the amount of the product 2648 distributed).

Any of the methods described herein may be totally or partially performed with a computer system including one or more processors, which can be configured to perform the steps. Thus, embodiments can be directed to computer systems configured to perform the steps of any of the methods described herein, potentially with different components performing respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

The examples and embodiments described herein are for illustrative purposes only. Various modifications or changes in light thereof will be apparent to persons skilled in the art. These are to be included within the spirit and purview of this application.

The invention claimed is:

1. A method of coordinated distribution of hairstyling products using electronic equipment connected over a computer network, the method comprising:
   receiving, by the electronic equipment comprising a processor, a product request for a stylist assigned a customer;
   determining, by the electronic equipment, a product and an amount of the product to distribute based on the product request;
   based on a record of previous exposure of the stylist to the product, identifying, by the electronic equipment, potentially harmful effects to physical health of the stylist from exposure to the amount of the product, with no identified potentially harmful effects resulting in distribution approval for the amount of the product; and
   based on the distribution approval, generating, by the electronic equipment, for an automatic pump, a request for distribution for the amount of the product.

2. The method of claim 1, further comprising:
   based on potentially harmful effects, the product, and the amount of the product, selecting by the electronic equipment, an alternative product and an alternative amount of product;
   based on the selection of the alternative product, generating, by the electronic equipment, for the automatic pump, a request for distribution for the alternative amount of the alternative product.

3. The method of claim 1, further comprising, based on the distribution approval, facilitating, by electronic equipment, distributing by the automatic pump, the amount of the product.

4. The method of claim 1, wherein the identifying of the potentially harmful effects to the stylist is further based on personal characteristics of the stylist.

5. The method of claim 1, wherein the identifying of the potentially harmful effects to the stylist is further based on demographic characteristics of the stylist.

6. The method of claim 1, further comprising, upon distribution of the amount of the product:
   identifying, by the electronic equipment, a handling procedure used by the stylist to handle the distribution of the amount of the product, wherein the record of previous exposure of the stylist comprises handling procedures used by the stylist for previous distributions of the product.

7. The method of claim 6, wherein the handling procedure implicates gloves used by the stylist.

8. The method of claim 6, wherein the handling procedure implicates a respirator used by the stylist.

9. The method of claim 1, further comprising, upon distribution of the amount of the product, based on the potentially harmful effects, identifying a handling procedure to potentially mitigate the potentially harmful effects.

* * * * *